US012704801B2

(12) United States Patent
Sekimizu et al.

(10) Patent No.: US 12,704,801 B2

(45) Date of Patent: Aug. 11, 2026

(54) IMAGE FORMING APPARATUS

(71) Applicant: CANON KABUSHIKI KAISHA, Tokyo (JP)

(72) Inventors: Koichi Sekimizu, Shiga (JP); Yoji Misao, Shizuoka (JP); Taisuke Hyodo, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/078,086

(22) Filed: Mar. 12, 2025

(65) Prior Publication Data

US 2025/0291279 A1 Sep. 18, 2025

(30) Foreign Application Priority Data

Mar. 13, 2024 (JP) ................................ 2024-038813

(51) Int. Cl.

*G03G 15/16* (2006.01)

*G03G 15/00* (2006.01)

(Continued)

(52) U.S. Cl.

CPC ....... *G03G 15/161* (2013.01); *G03G 15/0131* (2013.01); *G03G 15/0142* (2013.01);

(Continued)

(58) Field of Classification Search

CPC ........... G03G 15/0131; G03G 15/0142; G03G 15/0189; G03G 15/1605; G03G 15/161; G03G 15/1615; G03G 15/165; G03G 15/6558; G03G 15/751; G03G 21/16; G03G 21/1604; G03G 21/1609; G03G 21/1619;

(Continued)

(56) References Cited

U.S. PATENT DOCUMENTS

2010/0329738 A1 12/2010 Shirai

2013/0108320 A1* 5/2013 Ju ..................... G03G 21/1623 399/121

(Continued)

FOREIGN PATENT DOCUMENTS

JP 2009128506 A 6/2009

JP 2012247704 A 12/2012

*Primary Examiner* — Joseph S Wong

(74) *Attorney, Agent, or Firm* — Canon U.S.A., Inc.

(57) ABSTRACT

An image forming apparatus includes an apparatus main body, a supported unit movable relative to the apparatus main body to an inside position inside the apparatus main body and an outside position outside the apparatus main body, the supported unit including a primary transfer roller, an intermediate transfer belt, and a photosensitive member, an opening/closing member movable relative to the apparatus main body to a closed position and an open position retracted from the closed position, the opening/closing member being configured to block a movement path for the supported unit, and a transfer unit having a secondary transfer roller. When the supported unit is at the inside position, the intermediate transfer belt is positioned below the photosensitive member, and when the supported unit is at the outside position, the supported unit is supported by the transfer unit, and the transfer unit is positioned below the intermediate transfer belt.

18 Claims, 17 Drawing Sheets

(51) Int. Cl.
*G03G 15/01* (2006.01)
*G03G 21/16* (2006.01)
*G03G 21/18* (2006.01)

(52) U.S. Cl.
CPC ..... *G03G 15/0189* (2013.01); *G03G 15/1605* (2013.01); *G03G 15/1615* (2013.01); *G03G 15/165* (2013.01); *G03G 15/6558* (2013.01); *G03G 15/751* (2013.01); *G03G 21/16* (2013.01); *G03G 21/1604* (2013.01); *G03G 21/1609* (2013.01); *G03G 21/1619* (2013.01); *G03G 21/1623* (2013.01); *G03G 21/1633* (2013.01); *G03G 21/1638* (2013.01); *G03G 21/1642* (2013.01); *G03G 21/1647* (2013.01); *G03G 21/1661* (2013.01); *G03G 21/1671* (2013.01); *G03G 21/168* (2013.01); *G03G 21/1803* (2013.01); *G03G 21/1817* (2013.01); *G03G 21/1821* (2013.01); *G03G 21/1839* (2013.01); *G03G 21/1842* (2013.01); *G03G 21/1846* (2013.01)

(58) Field of Classification Search
CPC ........... G03G 21/1623; G03G 21/1633; G03G 21/1638; G03G 21/1642; G03G 21/1647; G03G 21/1661; G03G 21/1671; G03G 21/168; G03G 21/1803; G03G 21/1817; G03G 21/1821; G03G 21/1839; G03G 21/1842; G03G 21/1846
See application file for complete search history.

(56) References Cited

U.S. PATENT DOCUMENTS

2014/0079434 A1* 3/2014 Sakashita ........... G03G 21/1633 399/121
2014/0140727 A1* 5/2014 Shimoi .............. G03G 21/1633 399/121

* cited by examiner

IMAGE FORMING APPARATUS

BACKGROUND

Field

The present disclosure relates to an image forming apparatus that forms images on a recording medium.

Description of the Related Art

Some image forming apparatuses, such as printers, copiers, and multifunction devices, are configured to allow cartridges to be detachably mounted on a tray that can move between the inside and outside of the apparatus main body. Among such image forming apparatuses, some have a door that can be opened and closed to cover an opening portion for pulling out the tray from the apparatus main body (Japanese Patent Application Publication No. 2009-128506).

In the example disclosed in Japanese Patent Application Publication No. 2009-128506, when the tray is pulled out to the outside of the apparatus main body, connecting arms that connect the door and an internal component of the apparatus main body support the tray to prevent the front side of the tray from sagging downward under its own weight or the weight of the cartridge, which could damage the surface of the drum.

SUMMARY

The present disclosure provides a technology that enables the tray to be supported with a simple structure.

According to some embodiments, an image forming apparatus that forms an image on a recording medium according to the present disclosure includes features characterized as: an apparatus main body; a supported unit movable relative to the apparatus main body to an inside position inside the apparatus main body and an outside position outside the apparatus main body, the supported unit comprising a primary transfer roller, an intermediate transfer belt, and a photosensitive member configured to bear a toner image; an opening/closing member movable relative to the apparatus main body to a closed position and an open position retracted from the closed position, the opening/closing member being configured to block a movement path for the supported unit from the inside position to the outside position in a case where the opening/closing member is at the closed position; and a transfer unit having a secondary transfer roller that abuts against the intermediate transfer belt, wherein in a case where the supported unit is at the inside position, the intermediate transfer belt is positioned below the photosensitive member, and wherein in a case where the supported unit is at the outside position, the supported unit is supported by the transfer unit, and the transfer unit is positioned below the intermediate transfer belt.

According to the present disclosure, the tray can be supported with a simple structure.

Further features of the present disclosure will become apparent from the following description of exemplary embodiments with reference to the attached drawings.

DESCRIPTION OF THE EMBODIMENTS

Modes for carrying out the disclosure will be described in detail by way of illustration with reference to the drawings and embodiments. Note however that the dimensions, materials, shapes, and relative arrangements of the components in the following description of embodiments may be modified as appropriate according to the configuration of the apparatus to which the disclosure is applied and various conditions. More specifically, the following embodiments are not intended to limit the scope of the disclosure. Furthermore, not all features described in the following description of the embodiments are necessarily essential for the solution provided by the disclosure.

First Embodiment

Overall Structure

Figure 1:
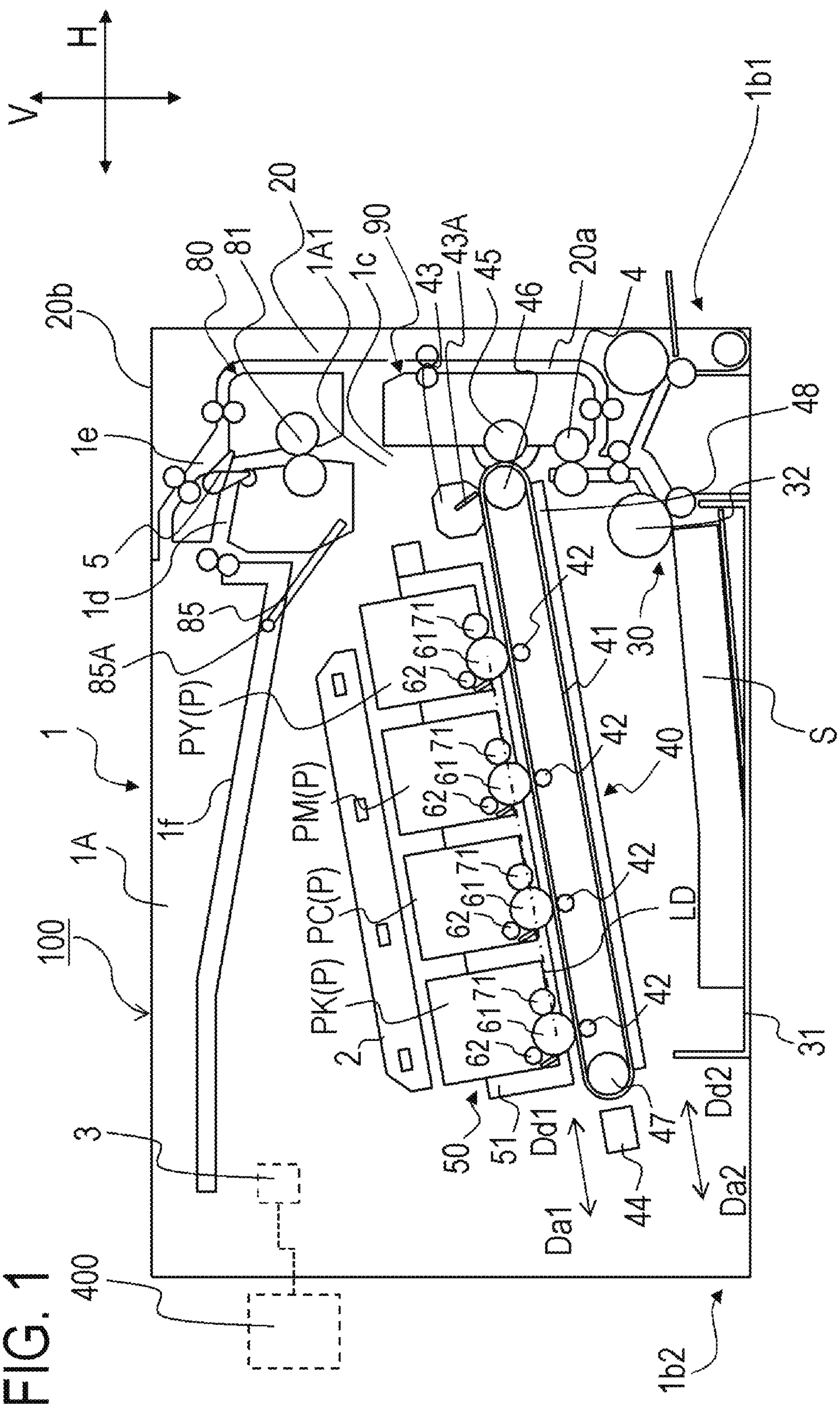
FIG. 1 is a view for illustrating an overall structure of a printer according to a first embodiment of the disclosure.

With reference to FIG. 1, a printer 1 as an image forming apparatus will be described. FIG. 1 is a view of an overall structure of the printer 1 according to the embodiment.

According to the embodiment, the printer 1 is an electrophotographic color laser beam printer that forms images on a sheet S as a recording material. In the drawings including FIG. 1, the arrow V represents the vertical direction (the direction of gravity), the arrow H represents the horizontal direction, and the printer 1 is provided on the horizontal installation surface as the normal installation state assumed for the printer 1.

The printer 1 has an apparatus main body (housing) 1A, a scanner (exposure device) 2, a control portion 3, and a door (opening and closing member) 20 that can be opened and closed with respect to the apparatus main body 1A. The printer 1 also has a sheet feed portion 30, a primary transfer unit (primary transfer device) 40, a tray unit (movement unit, support unit) 50, and a fixing apparatus 80. The part that includes the apparatus main body 1A and the door 20 can also be referred to as the main frame 100. The main frame 100 includes the exterior portion of the printer 1.

The apparatus main body 1A stores the scanner 2, the control portion 3, the sheet feed portion 30, the primary transfer unit 40, the tray unit 50, and the fixing apparatus 80.

The sheet feed portion 30 has a loading tray 31 for loading sheets S and a supply roller 32. The loading tray 31 can be drawn out in the direction of the door 20 to replenish sheets S.

The tray unit 50 has a tray (support member, drawer) 51 and cartridges PY, PM, PC, and PK. The tray 51 has a tray handle 52. The cartridge PY, PM, PC, and PK are removably attached to the tray 51.

The cartridges PY, PM, PC, and PK are removable from the tray 51 independently of each other. The cartridges PY, PM, PC, and PK contain yellow (Y), magenta (M), cyan (C), and black (K) toner (developing agents), respectively. The cartridges PY, PM, PC, and PK have the same structure except that these cartridges contain toner of different colors. Therefore, the structure and operation of one of the cartridges, PY, PM, PC, or PK will be described, and the description of the other cartridges may be omitted. Also, to simplify distinguishing between the cartridges, PY, PM, PC, and PK, the cartridges, PY, PM, PC, and PK may be referred to simply as the cartridge P. It can be said that the tray unit 50 has multiple cartridges P and the tray 51 to which the cartridges P are removably attached.

According to the embodiment, the tray unit 50 has multiple photosensitive drums (photosensitive members, image bearing members) 61, multiple charging rollers 62 (charging members), and multiple developing rollers (developer bearing members) 71. Specifically, the tray unit 50 has four photosensitive drums 61, four charging rollers 62, and four developing rollers 71. The rotation axis directions of the photosensitive drums 61, the developing rollers 71, and the charging rollers 62 are mutually parallel.

The part that forms the black (K) image is referred to as the black station (first station), and the photosensitive drum 61 of the first station is referred to as a first photosensitive drum, the developing roller 71 as a first developing roller, and the charging roller 62 as a first charging roller. The part that forms the cyan (C) image is referred to as the cyan station (second station), and the photosensitive drum 61 of the second station is referred to as a second photosensitive drum, a developing roller 71 as a second developing roller, and the charging roller 62 as a second charging roller. The part that forms the magenta (M) image is referred to as the magenta station (third station), and the photosensitive drum 61 of the third station is referred to as a third photosensitive drum, the developing roller 71 as a third developing roller, and the charging roller 62 as a third charging roller. The part that forms the yellow (Y) image is referred to as the yellow station (fourth station), and the photosensitive drum 61 of the fourth station is referred to as a fourth photosensitive drum, the developing roller 71 is referred to as a fourth developing roller, and the charging roller 62 is referred to as a fourth charging roller.

The cartridge PK is mounted in the black station, the cartridge PC is mounted in the cyan station, the cartridge PM is mounted in the magenta station, and the cartridge PY is mounted in the yellow station. According to the embodiment, the cartridge PK is referred to as the first cartridge, the cartridge PC as the second cartridge, the cartridge PM as the third cartridge, and the cartridge PY as the fourth cartridge. The numbers 1, 2, 3, and 4 are used for convenience in the description.

The photosensitive drum 61, the charging roller 62, and the developing roller 71 need only be provided in either the cartridge P or the tray 51. According to the embodiment, the cartridge P includes the photosensitive drum 61, the charging roller 62, and the developing roller 71. In other words, the photosensitive drum 61 for bearing the toner image and the charging roller 62 and the developing roller 71 for forming the toner image on the photosensitive drum 61 are configured as the cartridge P in an attachable and detachable manner with respect to the tray 51. The configuration of the cartridge P is not limited to this. For example, the photosensitive drum 61 may be provided on the tray 51, and the charging roller 62 and developing roller 71, which constitute the toner image forming portion that forms the toner image on the photosensitive drum 61, may be provided as the cartridge P, which is attachable to and detachable from the tray 51.

The primary transfer unit 40 has a belt 41, a primary transfer roller 42, a cleaning portion 43, a drive roller 46 that drives the belt 41, and a tension roller (driven roller) 47. The printer 1 in this embodiment has an optical sensor 44 that detects the toner image transferred to the belt 41. In this embodiment, the belt 41 has a continuous annular shape and is tensioned by the drive roller 46 and the tension roller 47, which are arranged as multiple rollers inside the annular belt 41. The belt 41 is arranged below the photosensitive drum 61 and is allowed to abut the photosensitive drum 61 so that a primary transfer portion is formed between the belt 41 and the photosensitive drum 61. The printer 1 also has a secondary transfer unit 90 including a secondary transfer roller 45 in abutment against the belt 41 to form a secondary transfer portion. The secondary transfer unit 90 is arranged so that the unit can be opened and closed with respect to the apparatus main body 1A. The secondary transfer portion is formed between the belt 41 and the secondary transfer roller 45. The rotation axis directions of the primary transfer roller 42, the drive roller 46, the tension roller 47, and the secondary transfer roller 45 are mutually parallel. A registration roller pair 4 is arranged in front of the secondary transfer portion.

The fixing apparatus 80 includes a fixing portion 81 and a flapper 5. When image forming operation is performed on a sheet S, the fixing apparatus 80 is in an operational position. The fixing apparatus 80 is stored in (inside) the apparatus main body 1A in the operational position. The fixing apparatus 80 is also configured to heat the sheet S when in the operational position. In the embodiment, the fixing portion 81 includes a heating portion (heating roller) including a heater and a pressure portion (pressure roller).

Figure 2:
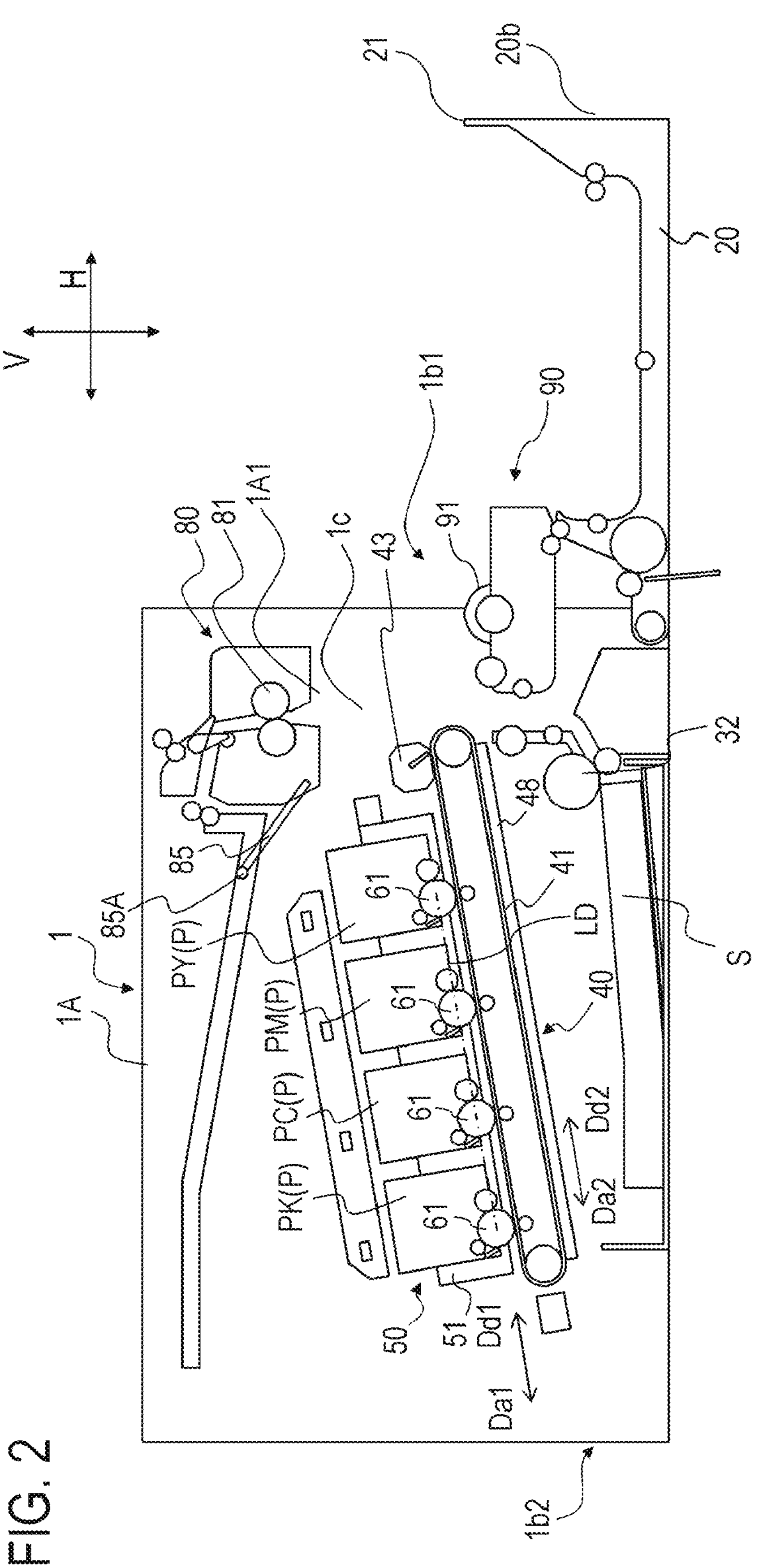
FIG. 2 is a view of the printer according to the first embodiment with the door and secondary transfer unit in an open state.
Figure 3:
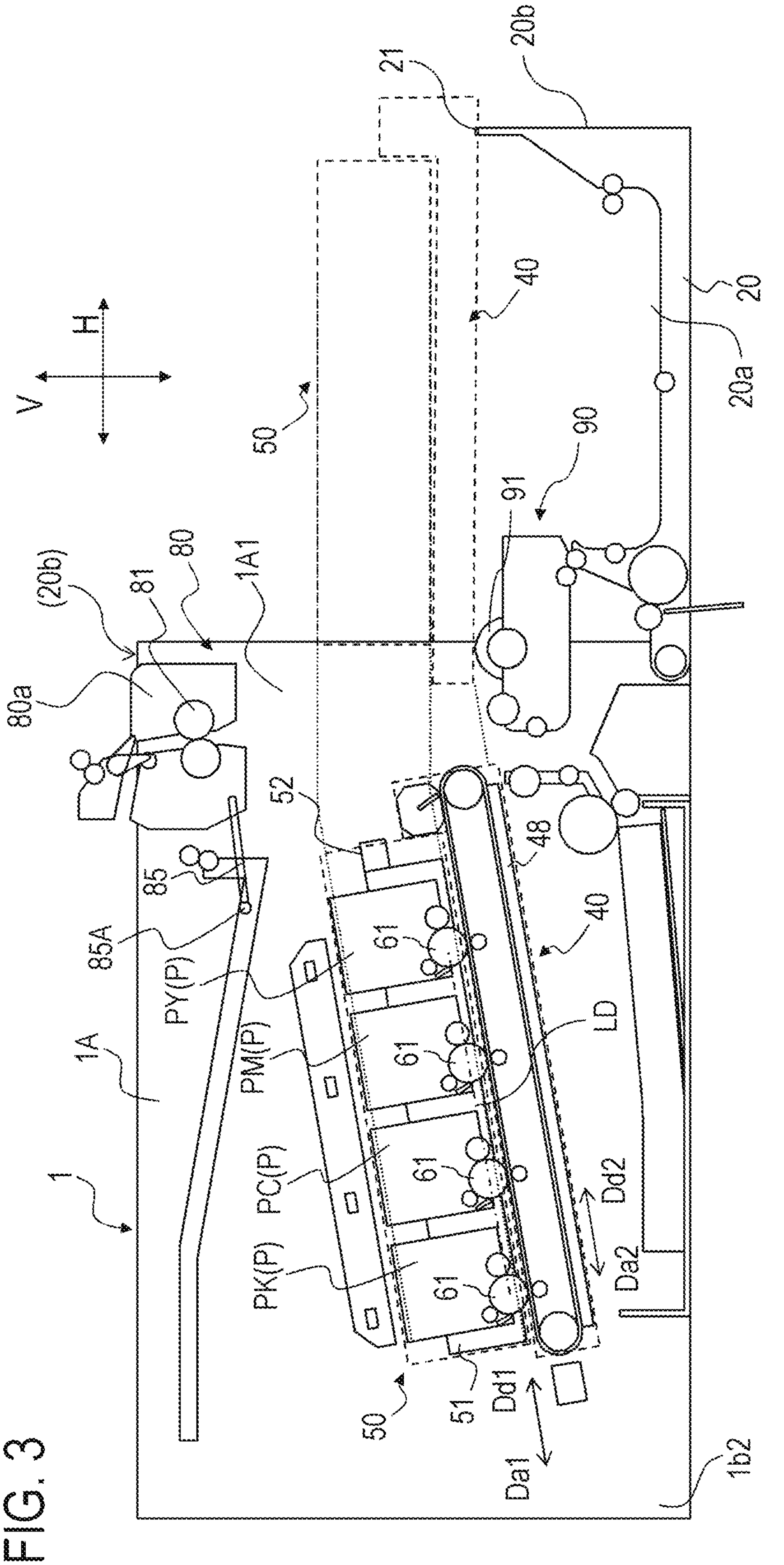
FIG. 3 is a view of the printer according to the first embodiment after the movement of the fixing apparatus.

The movement of the primary transfer unit 40 and the tray unit 50 will be described with reference to FIGS. 1 to 7. FIG. 2 is a view of the printer 1 with the door 20 and the secondary transfer unit 90 opened. FIG. 3 is a view of the printer 1 after the movement of the fixing apparatus 80. FIGS. 4 to 7 show the state transition of the primary transfer unit 40 and the tray unit 50 being gradually pulled out from the inside of the apparatus main body 1A.

The primary transfer unit 40 and the tray unit 50 can be moved from the inside of the apparatus main body 1A to the outside of the apparatus main body 1A. In the horizontal direction H, the apparatus main body 1A has a first end 1*b*1 having an opening 1A1 and a second end 1*b*2 opposite the first end 1*b*1. The tray unit 50 is movable to a first inside position inside the apparatus main body 1A and a first outside position outside the apparatus main body 1A through the opening 1A1. The primary transfer unit 40 is movable to a second inside position inside the apparatus main body 1A and a second outside position outside the apparatus main body 1A through the opening 1A1. The opening 1A1 may include an opening through which the tray unit 50 passes and an opening through which the primary transfer unit 40 passes. When the primary transfer unit 40 moves from the second inside position to the second outside position, at least the belt 41 is moved, and at least a part of the belt 41 protrudes from the apparatus main body 1A toward the outside of the apparatus main body 1A.

The direction in which the tray unit 50 moves from the first inside position to the first outside position is referred to as the first removal direction Dd1, and the direction opposite the first removal direction Dd1 is referred to as the first attachment direction Da1. It can be said that the first removal direction Dd1 is the direction from the second end 1*b*2 to the first end 1*b*1.

The direction in which the primary transfer unit 40 moves from the second inside position to the second outside position is referred to as the second removal direction Dd2, and the direction opposite the second removal direction Dd2 is referred to as the second attachment direction Da2. In the second removal direction Dd2, the drive roller 46 is positioned downstream of the tension roller 47. It can be said that the second removal direction Dd2 is the direction from the second end 1*b*2 to the first end 1*b*1.

The first removal direction Dd1 and the first attachment direction Da1 are directions that intersect (preferably at a right angle) with the rotation axis direction of the photosensitive drum 61. The second removal direction Dd2 and the second attachment direction Da2 are directions that intersect (preferably at a right angle) the rotation axis direction of the drive roller 46. The rotation axis direction of the drive roller 46 is parallel to the rotation axis direction of the photosensitive drum 61.

In the horizontal direction H, the fixing apparatus 80 is arranged on one end side (the side where the first end 1*b*1 is arranged) of the apparatus main body 1A.

The door 20 attached to the apparatus main body 1A is movable between a closed position (first closed position) in which the inside of the apparatus main body 1A is closed to the outside and an open position (first open position) in which the inside of the apparatus main body 1A is opened to the outside. As shown in FIG. 1, when the door 20 is at the closed position (with the door 20 closed), the door 20 covers the opening 1A1.

While the door 20 is at the open position (with the door 20 open), the secondary transfer unit 90 is positioned so that the secondary transfer unit 90 can be opened and closed with respect to the apparatus main body 1A, and when the secondary transfer unit 90 is open, the opening 1A1 is exposed to the outside as shown in FIG. 2. In other words, the secondary transfer unit 90 can also move, with respect to the apparatus main body 1A, between the closed position (second closed position) in which the opening 1A1 is closed to the outside of the apparatus main body 1A, and the open position (second open position) in which the opening 1A1 is open to the outside of the apparatus main body 1A. The secondary transfer unit 90 is configured to close the opening 1A1 from the inside of the door 20. The secondary transfer unit 90 is configured to be movable relative to the apparatus main body 1A independently of the door 20, in other words, the unit is configured to be movable not only relative to the apparatus main body 1A but also relative to the door 20 (i.e., capable of changing its relative position).

The tray unit 50, as a first unit, is pulled out from the apparatus main body 1A through the opening 1A1 along a first moving path from the first inside position to the first outside position. The primary transfer unit 40, as a second unit, is also pulled out from the apparatus main body 1A through the opening 1A1, following the second moving path from the second inside position to the second outside position. When the door 20 and the secondary transfer unit 90 are at the closed position, the moving paths of the tray unit 50 and the primary transfer unit 40 are blocked, and when these units are retracted to the open position, the moving paths are opened.

The secondary transfer unit 90 according to the embodiment is arranged so that the unit can be opened and closed with respect to the apparatus main body 1A in conjunction with the opening and closing of the door 20. In other words, the secondary transfer unit 90 moves to an open state in conjunction with the opening operation of the door 20, and the secondary transfer unit 90 moves to a closed state in conjunction with the closing operation of the door 20.

As shown in FIG. 1, when the door 20 is at the closed position, the door 20 covers the fixing apparatus 80 attached to the apparatus main body 1A. More specifically, when the door 20 is at the closed position, the upper cover portion 20*b* of the door 20 is located above the fixing apparatus 80. The upper cover portion 20*b* of the door 20 functions as part of the exterior portion.

The door 20 can be moved between the open position and the closed position while the fixing apparatus 80 is supported by the apparatus main body 1A. In other words, the door 20 moves from the closed position to the open position to move away from the fixing apparatus supported by the apparatus main body 1A. Therefore, as shown in FIG. 2, when the door 20 is at the open position, the door 20 is away from the fixing apparatus 80 supported by the apparatus main body 1A.

Figure 7:
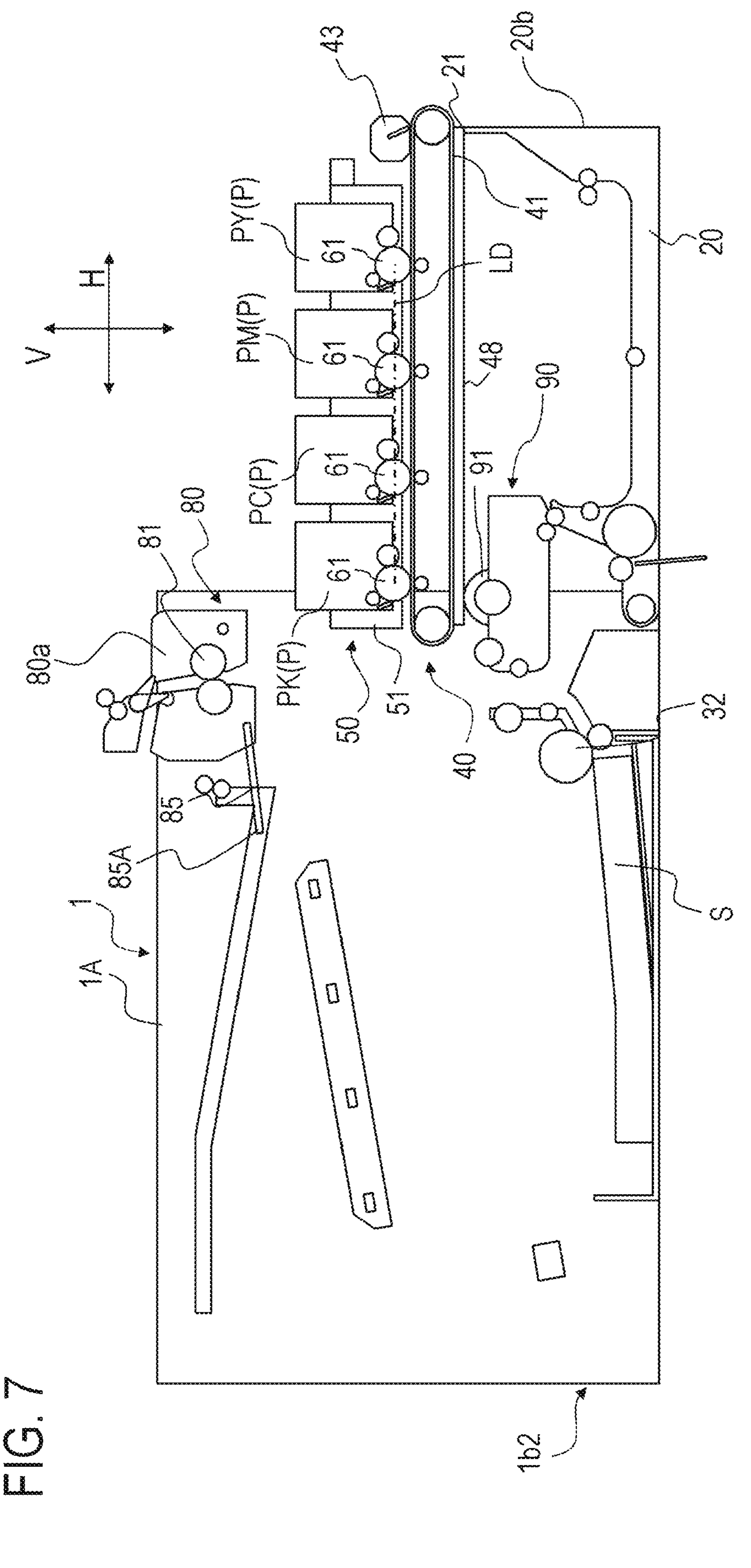
FIG. 7 is a view showing how the primary transfer unit and the tray unit according to the first embodiment are pulled out.

As will be described later, the fixing apparatus 80 can be moved from the state shown in FIG. 2 to the state shown in FIG. 3 so that the opening 1A1 is widely exposed. In the state after the movement of the door 20 and the fixing apparatus 80 (FIG. 3), the primary transfer unit 40 and the tray unit 50 can be moved from the inside of the apparatus main body 1A to the outside through the opening 1A1, and after the movement, the state shown in FIG. 7 is obtained.

In the state after the movement of the tray unit 50 to the outside of the apparatus main body 1A (FIG. 7), the cartridges PY, PM, PC, and PK can be removed from the tray 51, and the cartridges PY, PM, PC, and PK can be attached to the tray 51. This allows the user to replace the cartridge PY, PM, PC, or PK with a new cartridge PY, PM, PC, or PK. In this embodiment, the cartridge P is removable from the tray 51 in a direction that intersects (preferably, a direction that is orthogonal to) the rotation axis of the photosensitive drum 61.

The cartridges PY, PM, PC, and PK are removed from the tray 51 by moving relative to the tray 51 in a direction away from the primary transfer unit 40. In other words, the cartridges PY, PM, PC, and PK are removed from the tray 51 by moving in the direction opposite to the primary transfer unit 40 with respect to the tray 51. In the embodiment, the primary transfer unit 40 is located below the tray unit 50. Therefore, the cartridges PY, PM, PC, and PK are moved upwards relative to the tray 51 and removed from the tray 51.

The primary transfer unit 40 can be removed from the apparatus main body 1A independently of the tray unit 50 and replaced with a new primary transfer unit 40.

Image Formation Operation

With reference to FIG. 1, the image formation operation of the printer 1 will be described. The control portion 3 of the printer 1 starts the image formation operation on a sheet S based on an image signal received from the external host device 400. The external host device 400 is, for example, a personal computer, an image reader, and a facsimile.

When image formation is performed on the sheet S, the fixing apparatus 80 is in the operational position, the tray unit 50 is at the first inside position, the primary transfer unit 40 is at the second inside position, and the door 20 is at the closed position. While the primary transfer unit 40 is at the second inside position, the belt 41 can abut the photosensitive drum 61. At this time, the tray unit 50 is positioned above the primary transfer unit 40.

A charging voltage is applied to the charging roller 62, which causes the photosensitive drum 61 to rotate. A laser beam corresponding to the image information is emitted from the scanner 2 onto the photosensitive drum 61, and the surface of the photosensitive drum 61, which has been charged by the charging roller 62, is exposed. As a result, an electrostatic latent image corresponding to the image information is formed on the surface of the photosensitive drum 61.

The developing roller 71 bears toner. A developing voltage is applied to the developing roller 71, and the electrostatic latent image formed on the photosensitive drum 61 is developed using the toner supplied from the developing roller 71, forming a toner image on the surface of the photosensitive drum 61. In this embodiment, the developing roller 71 develops the latent image while in contact with the photosensitive drum 61, but the developing roller 71 may also develop the latent image while there is a gap between the developing roller 71 and the photosensitive drum 61. When a full-color image is formed, a toner image of each color is formed on each photosensitive drum 61.

In this embodiment, when the tray unit 50 is at the first inside position, the developing roller 71 is movable between an abutment position in abutment against the photosensitive drum 61 and a separation position separated from the photosensitive drum 61. Specifically, the developing roller 71 is switched between the abutment position and the separation position by a switching device provided in the apparatus main body 1A. This allows the developing roller 71 to be separated from the photosensitive drum 61 when the image forming operation is not performed.

The printer 1 can also perform mono-color printing while the developing roller 71 and the photosensitive drum 61 corresponding to the cartridge PK are in abutment and the developing rollers 71 and the photosensitive drums 61 corresponding to the cartridges PY, PM, and PC are separated. The printer 1 can also perform full-color printing while the photosensitive drums 61 corresponding to the cartridges PY, PM, PC, and PK in contact with the belt 41.

A toner image formed on each photosensitive drum 61 is transferred to the belt 41 by the primary transfer roller 42 at the primary transfer portion and is conveyed to the secondary transfer portion formed by the belt 41 and the secondary transfer roller 45.

Meanwhile, the apparatus main body 1A has a conveyance path (first path, first conveyance path) 1*c* through which the sheet S passes on the way to the fixing apparatus 80. The door 20 has a double-sided conveyance path (second path, second conveyance path) 20*a* through which the sheet S passes after passing through the fixing apparatus 80. When in the closed state, the door 20 covers the conveyance path 1*c*. When the door 20 is opened, the conveyance path 1*c* and a double-sided conveyance path 20*a* are exposed (FIG. 2).

In the sheet feed portion 30, one sheet S is separated and fed from the sheet S loaded on the loading tray 31 by the supply roller 32 at a prescribed timing and is conveyed through the conveyance path 1*c* toward the secondary transfer portion and the fixing apparatus 80.

At the secondary transfer portion, the toner image is transferred from the belt 41 to the sheet S. The toner that has not been transferred to the sheet S is removed from the belt 41 by the cleaning blade (cleaning member) 43A provided in the cleaning portion 43.

The sheet S to which a toner image has been transferred at the secondary transfer portion is conveyed towards the fixing apparatus 80. In the fixing apparatus 80, the sheet S is heated and pressed in the fixing portion 81, and the toner image is fixed to the sheet S. The sheet S with the fixed toner image is conveyed to the flapper 5, which acts as a route switching portion. The flapper 5 can be moved to a paper ejection position, which guides the sheet S that has passed through the fixing apparatus 80 to a paper ejection path 1*d*, or to a reversing position, which guides the sheet to a reversing path 1*e*.

When single-sided printing is performed, i.e., when an image is formed on one side of the sheet S, the sheet S is guided to the ejection path 1*d* by the flapper 5 and discharged onto the discharge tray 1*f* formed on the upper part of the apparatus main body 1A Meanwhile, when double-sided printing is performed, i.e., when an image is printed on both sides of the sheet S, the sheet S is guided to the reversing path 1*e* by the flapper 5. After the sheet S is guided into the reversing path 1*e*, the sheet S is reversed in the conveying direction, and the sheet S is conveyed to the secondary transfer portion through the double-sided conveyance path 20*a* formed in the door 20. After the toner image is transferred to the back of the sheet S at the secondary transfer portion, the sheet S passes through the fixing apparatus 80 and is guided into the ejection path 1*d* by the flapper 5 and discharged onto the discharge tray 1*f* of the apparatus main body 1A.

Removal of Tray Unit and Primary Transfer Unit and Arrangement of Fixing Apparatus With the use of FIGS. 1 to 4, how to remove the tray unit 50 and the primary transfer unit 40 from the apparatus main body 1A and how to arrange the fixing apparatus 80 will be described.

As described above, the fixing apparatus 80 of the printer 1 is arranged on one end of the apparatus main body 1A in the horizontal direction. The primary transfer unit 40 and the tray unit 50 move from one end of the apparatus main body 1A to the outside of the apparatus main body 1A through the opening 1A1. In other words, in the horizontal direction H, the fixing apparatus 80 is closer to the first end **1*b*1 than to the second end 1*b*2. More specifically, in the horizontal direction H, the distance between the fixing apparatus 80 and the first end 1*b*1 is shorter than the distance between the fixing apparatus 80 and the second end 1*b*2. The fixing apparatus 80 is arranged at a position closer to the first end 1*b*1 than to the center of the apparatus main body 1A in the horizontal direction H, and it can be said that the distance between the first end 1*b*1 and the fixing apparatus 80 in the horizontal direction His shorter than the distance between the first end 1*b*1 and the center of the apparatus main body 1**A.

As described above, when the tray unit 50 moves from the first inside position to the first outside position, the movement direction of the tray unit 50 is a direction that crosses the rotation axis of the photosensitive drum 61. At the time, the tray unit 50 moves away from the second end **1*b*2**.

As described above, when the primary transfer unit 40 moves from the second inside position to the second outside position, the movement direction of the primary transfer unit 40 crosses the rotation axis of the drive roller 46. At the time, the primary transfer unit 40 moves away from the second end **1*b*2**.

As described above, the door 20 according to the embodiment in the closed state closes the opening 1A1 and covers at least a part of the conveyance path **1*c* for the sheet S. The door 20 also includes the double-sided conveyance path 20*a*. If the sheet S gets stuck (hereinafter referred to as a jam), the user of the printer 1 can remove the sheet S from one end of the apparatus main body 1A and clear the jam. Specifically, the door 20 can be moved to the open position to allow access to the inside of the apparatus main body 1A, and the sheet S can be removed. Also, if part of the sheet S that has passed through the fixing apparatus 80 is exposed to the outside of the apparatus main body 1A, the sheet S can be removed by pulling it from outside the apparatus main body 1A without opening the door 20**.

The user of the printer 1 can move the primary transfer unit 40 and the tray unit 50 from one end of the apparatus main body 1A to the outside of the apparatus main body 1A, and perform tasks such as checking the states of the primary transfer unit 40 and the cartridge P, maintenance, and replacement.

In other words, the printer 1 is configured such that the fixing apparatus 80 is arranged on one end side of the apparatus main body 1A, and the primary transfer unit 40 and the tray unit 50 can be moved in and out of the apparatus main body 1A through this end. As a result, the user can clear a jam, access the fixing apparatus 80, and operate the primary transfer unit 40 and the tray unit 50 in a single direction.

According to the embodiment, the front of the printer 1 is the side of the door 20. Therefore, it is sufficient to secure a space for performing tasks such as clearing jams and operating the primary transfer unit 40 and the tray unit 50 from the front of the printer 1. Meanwhile, it is not necessary to secure a space for performing these tasks from the left, right, rear, or top of the printer 1. Therefore, the printer 1 can be installed in a space-saving manner.

If the primary transfer unit 40 or the tray unit 50 is pulled out from the other end side of the apparatus main body 1A, the user needs to access both end sides of the apparatus main body 1A in order to clear jams and pull out the primary transfer unit 40 or the tray unit 50. If one of the primary transfer unit 40 and the tray unit 50 is pulled out from one end of the apparatus main body 1A, and the other is pulled out from the other end, the user needs access to both ends of the apparatus main body 1A. As a result, space for working not only from the front but also from the rear of the apparatus main body 1A may be desired, resulting in an increase in the area used for installing the printer 1.

According to the embodiment, the sheet S can be replenished from one end of the apparatus main body 1A. Therefore, as long as there is enough space to replenish the sheet S from the front of the printer 1, the printer 1 can be installed in a space-saving manner.

Relation Between Tray Unit and Fixing Apparatus

Figure 8:
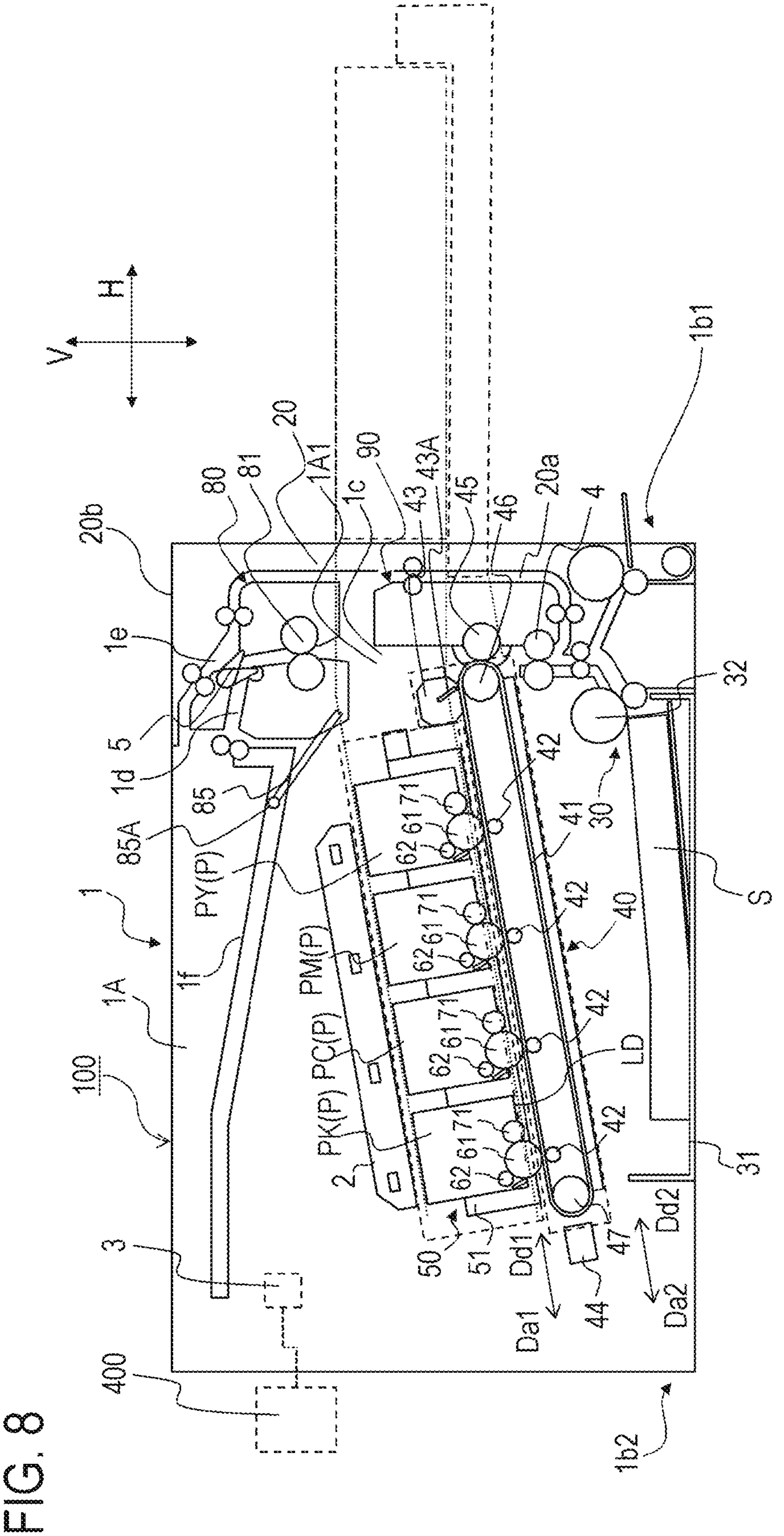
FIG. 8 is a view for illustrating the movement of the primary transfer unit and the tray unit according to the first embodiment.
Figure 9:
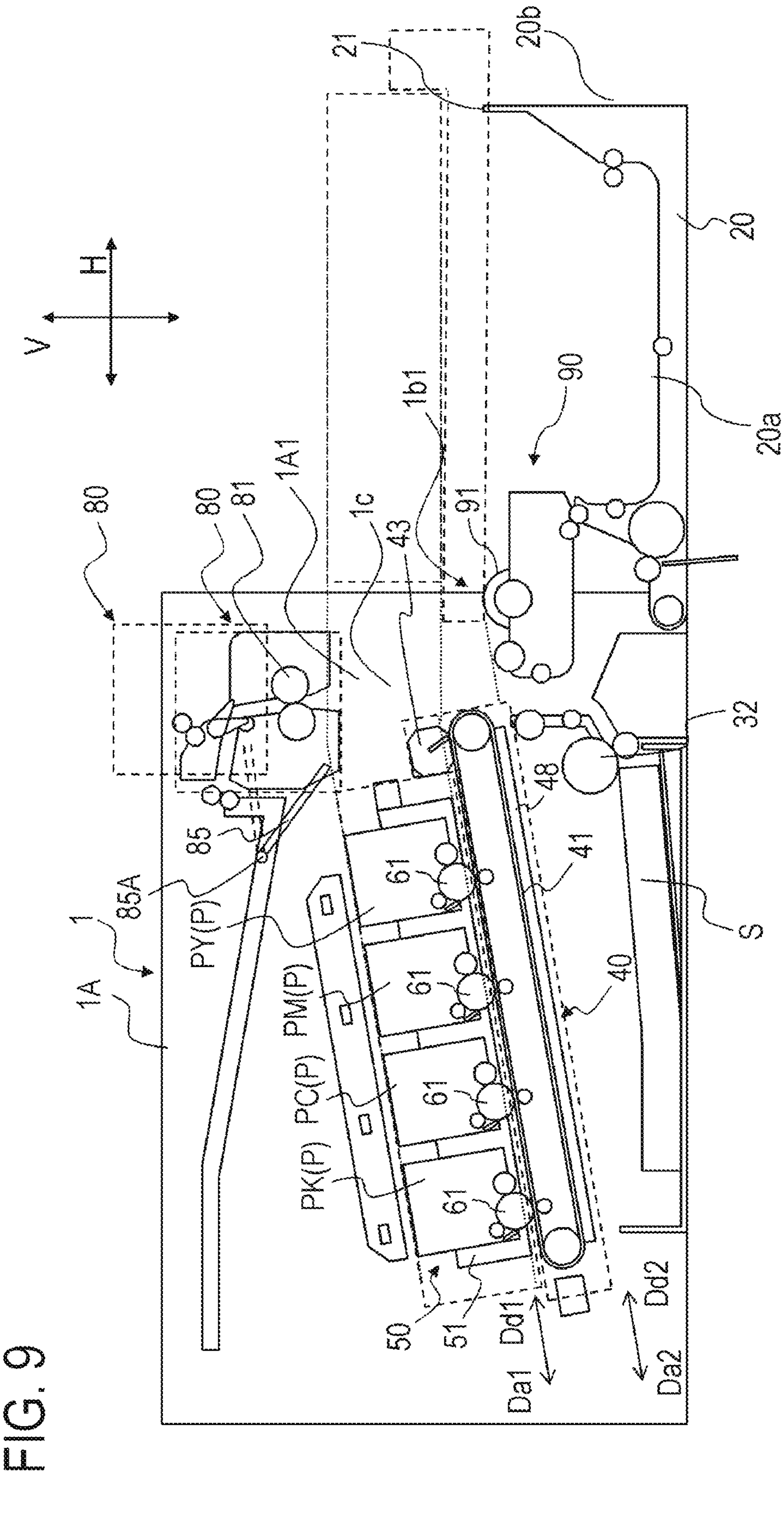
FIG. 9 is a view for illustrating the movement of the primary transfer unit and the tray unit according to the first embodiment.

The relation between the tray unit 50 and the fixing apparatus 80 will be described with reference to FIGS. 1 to 4, 8, and 9. FIGS. 8 and 9 illustrate the movement of the primary transfer unit 40 and the tray unit 50.

While moving between the first inside position, where image forming operation is performed on the sheet S, and the first outside position, where the cartridge P can be replaced, the tray unit 50 passes through a prescribed space. The space that the tray unit 50 passes through when moving from the first inside position to the first outside position is referred to as the first space (the movement space for the tray unit 50). The first space can also be referred to as the path or track (the first moving path, the first moving track) that the tray unit 50 passes through when moving from the first inside position to the first outside position.

While moving to the second inside position, where the image forming operation is performed on the sheet S, and the second outside position, the primary transfer unit 40 passes through a prescribed space. The space that the primary transfer unit 40 passes through when moving from the second inside position to the second outside position is referred to as the second space (the movement space for the primary transfer unit 40). The second space can also be referred to as the path or track (second moving path, second moving track) that the primary transfer unit 40 passes through when the unit moves from the second inside position to the second outside position.

The position (operational position) of the fixing apparatus 80 when image forming operation is performed on the sheet S and the first and second spaces have the following relation.

More specifically, as shown in FIGS. 8 and 9, at least a part of the fixing apparatus 80 in the operational position overlaps the first space. In other words, when the fixing apparatus 80 is in the operational position, at least a part of the fixing apparatus 80 is inside the first space.

In the embodiment, at least a part of the fixing apparatus 80 overlaps the space through which the cartridge P passes when the tray unit 50 moves from the first inside position to the first outside position, but it may also be arranged to overlap the space through which the tray 51 passes.

In this way, the apparatus main body 1A in the operational position can be made smaller in size than the case in which the fixing apparatus 80 is located outside the first space.

As shown in FIG. 8, in the embodiment, when the door 20 is at the closed position, at least a part of the double-sided conveyance path **20*a* overlaps the first space. In other words, when the door 20 is at the closed position, at least a part of the double-sided conveyance path 20*a*** is inside the first space.

As described above, at least a part of the fixing apparatus 80 in the operational position is inside the first space. Therefore, when the fixing apparatus 80 is in the operational position, the tray unit 50 is restricted from moving from the first inside position to the first outside position. Meanwhile, the fixing apparatus 80 is configured to be retractable from the operational position. When the fixing apparatus 80 is in the state retracted from the operational position, the tray unit 50 is allowed to move from the first inside position to the first outside position. When the tray unit 50 moves from the first inside position to the first outside position, the tray unit 50 passes below the fixing apparatus 80. The fixing apparatus 80 is outside the second space in the operational position and the retracted position. Therefore, both when the fixing apparatus 80 is in the operational position and when the fixing apparatus 80 is in the retracted position, the primary transfer unit 40 can move from the second inside position to the second outside position. When the primary transfer unit 40 moves from the second inside position to the second outside position, the primary transfer unit 40 passes below the fixing apparatus 80.

The fixing apparatus 80 has a fixing frame body 80*a* that supports the fixing portion 81. When the fixing apparatus 80 is retracted from the operational position, the fixing frame body 80*a* is displaced relative to the apparatus main body 1A while supporting the fixing portion 81.

Movement of Tray Unit

When the tray unit 50 is pulled out to the outside of the apparatus main body 1A, the door 20 is first moved to the open position as shown in FIG. 2. In this embodiment, the door 20 can move to the open position and the closed position while the fixing apparatus 80 is in the operational position. Then, while the door 20 is at the open position, the secondary transfer unit 90 is moved to the open position as shown in FIG. 2, and the fixing apparatus 80 is moved from the operational position to the retracted position so that the apparatus is moved to the outside of the first space as shown in FIG. 3.

In the printer 1 according to the embodiment, the fixing apparatus 80 can move between the operational position and the retracted position, which is a position that is retracted from the operational position, while the apparatus is attached to the apparatus main body 1A. In the embodiment, when the fixing apparatus 80 is in the retracted position, the entire fixing apparatus 80 is positioned outside the first space.

The fixing apparatus 80 is lifted from the operational position and positioned in the retracted position above the operational position. In other words, the retracted position is a position higher than the operational position. As shown in FIG. 9, when the fixing apparatus 80 is in the retracted position, at least a part of the fixing apparatus 80 is positioned protruding from the apparatus main body 1A, facing outside the apparatus main body 1A. When the fixing apparatus 80 is in the retracted position, the position of at least a part of the fixing apparatus 80 is higher than the position of the upper cover portion 20*b* of the door 20 at the closed position. This allows the printer 1 to maintain a compact size in the vertical direction V when the fixing apparatus 80 is in the operational position, while enabling the fixing apparatus 80 to move to the retracted position to provide space for the tray unit 50 to move. When the fixing apparatus 80 is in the retracted position, the door 20 is restricted from taking the closed position.

Specifically, the printer 1 has a connecting member (fixing connecting member, fixing link, arm) 85 that is movably connected to the apparatus main body 1A. The fixing apparatus 80 is connected to the apparatus main body 1A through the connecting member 85.

The connecting member 85 is rotatable around the rotation center 85A, and when the tray unit 50 is pulled out of the apparatus main body 1A, the connecting member 85 is moved to the outside of the first space. The fixing apparatus 80 is pivotably connected to one end of the connecting member 85, and the other end of the connecting member 85 is connected to the apparatus main body 1A rotatably around the rotation center 85A. The fixing apparatus 80 can move from the operational position to the retracted position and from the retracted position to the operational position while being supported by the connecting member 85 (while being connected to the apparatus main body 1A through the connecting member 85). The connecting member 85 is configured to be movable (swingable) with respect to the apparatus main body 1A and the fixing apparatus 80. In other words, the fixing apparatus 80 is connected to the apparatus main body 1A through the connecting member 85. As a result, compared to the case in which the fixing apparatus 80 is directly connected to the apparatus main body 1A, the amount of movement of the fixing apparatus 80 between the retracted position and the operational position can be increased.

As shown in FIG. 9, when the tray unit 50 moves from the first inside position to the first outside position, the angle formed by the movement direction of the tray unit 50 and the horizontal direction H is smaller than the angle formed by the movement direction of the tray unit 50 and the vertical direction V. When the fixing apparatus 80 is moved from the operational position to the retracted position, the amount of movement of the fixing apparatus 80 in the vertical direction V is greater than the amount of movement of the fixing apparatus 80 in the horizontal direction H. In other words, when the fixing apparatus 80 is moved from the operational position to the retracted position, the amount of movement of the fixing apparatus 80 in the direction perpendicular to the movement direction of the tray unit 50 is greater than the amount of movement of the fixing apparatus 80 in the direction parallel to the movement direction of the tray unit 50.

The fixing apparatus 80 may be attached to the apparatus main body 1A through a guide fixed to the apparatus main body 1A and may move between the operational position and the retracted position in the state. In this case, the guide may be of any shape.

Note, however, that the method for moving the fixing apparatus 80 to the outside of the first space is not limited to this. For example, the fixing apparatus 80 may be made removable from the apparatus main body 1A by allowing it to be retracted from the operational position and moved to the outside of the first space. In other words, the fixing apparatus 80 may be moved to the outside of the first space by separating it from the apparatus main body 1A and the door 20 (from the main frame 100). Alternatively, the fixing apparatus 80 may be connected to the door 20, and the fixing apparatus 80 may be moved to the outside of the first space by opening the door 20.

Relation Between Tray Unit, Primary Transfer Unit, and Secondary Transfer Unit With reference to FIGS. 1 to 4, 8, and 9, the relation between the tray unit 50, the primary transfer unit 40, and the secondary transfer unit 90 will be described.

As shown in FIG. 3, when the fixing apparatus 80 is located outside the first space and the secondary transfer unit

90 is open, the user grasps the tray handle 52 and moves the tray unit 50 toward the outside of the apparatus main body 1A.

As shown in FIGS. 8 and 9, the primary transfer unit 40 and the first space have the following positional relation when image forming operation is performed on the sheet S.

More specifically, when image forming operation is performed on the sheet S, the primary transfer unit 40 is at the second inside position. At least a part of the primary transfer unit 40 at the second inside position overlaps the first space. In other words, when the primary transfer unit 40 is at the second inside position, at least a part of the primary transfer unit 40 is inside the first space. In the embodiment, at least a part of the primary transfer unit 40 overlaps the space through which the tray 51 passes when the tray unit 50 moves from the first inside position to the first outside position, but it may overlap the space through which the cartridge P passes. This allows the apparatus main body 1A to be made smaller than when the primary transfer unit 40 at the second inside position is located outside the space through which the tray 51 passes.

In the printer 1 according to the embodiment, the part of the primary transfer unit 40 that overlaps the first space is the cleaning portion 43 that houses a cleaning member 43A. However, any other part of the primary transfer unit 40 may overlap the first space. Also, in the embodiment, the cleaning member 43A of the primary transfer unit 40 at the second inside position overlaps the first space.

It can be said that the tray unit 50 and the primary transfer unit 40 satisfy the following relation. When the tray unit 50 is at the first inside position and the primary transfer unit 40 is at the second inside position, a part of the primary transfer unit 40 (cleaning portion 43) is downstream of the tray unit 50 in the movement direction in which the tray unit 50 moves from the first inside position to the first outside position. In the vertical direction V, the area (range) where the part of the primary transfer unit 40 (cleaning portion 43) is arranged downstream of the tray unit 50 at least partly overlaps the area (range) where the tray unit 50 is arranged. In other words, when viewed in the horizontal direction H, the area where the part of the primary transfer unit 40 is arranged and the area where the tray unit 50 is arranged has an overlapping part.

In the embodiment, when the door 20 is at the closed position, at least a part of the double-sided conveyance path 20*a* overlaps the second space through which the primary transfer unit 40 moves from the second inside position to the second outside position. In other words, when the door 20 is in the closed state, at least a part of the double-sided conveyance path 20*a* is inside the second space.

As described above, when the primary transfer unit 40 is at the second inside position, at least a part of the primary transfer unit 40 is inside the first space. Therefore, according to the embodiment, when the user moves the tray unit 50 from the first inside position to the first outside position with respect to the apparatus main body 1A, the primary transfer unit 40 is also moved from the second inside position to the second outside position with respect to the apparatus main body 1A. In other words, while the primary transfer unit 40 and the tray unit 50 are integrated, the tray unit moves from the first inside position to the first outside position, and the primary transfer unit 40 moves from the second inside position to the second outside position.

By moving the tray unit 50 and the primary transfer unit 40 in an integrated manner, the tray unit 50 is moved to the first outside position, which suppresses the exposure of the photosensitive drum 61, so that damage or contamination on the photosensitive drum 61 can be suppressed.

As shown in FIG. 9, when the door 20 is open, the tray unit 50 is at the first outside position, and the primary transfer unit 40 is at the second outside position, the primary transfer unit 40 supports the tray unit 50 from below. In this embodiment, the door 20 supports the secondary transfer unit 90, and the secondary transfer unit 90 supports the primary transfer unit 40. In other words, the secondary transfer unit 90 supported by the door 20 supports the tray unit 50 through the primary transfer unit 40. At the time, the secondary transfer unit 90 is positioned below the primary transfer unit 40, and the door 20 is positioned below the secondary transfer unit 90.

According to the embodiment, the primary transfer unit 40 has a transfer frame 48 that forms a frame, and the secondary transfer unit 90 has an abutment portion 91 that serves as a first supporting portion that supports the transfer frame 48 during the movement of the primary transfer unit 40. The abutment portion 91 is a bearing that supports the secondary transfer roller 45 in a rotatable manner and has a diameter that is larger than the outer diameter of the secondary transfer roller 45. In other words, the abutment portion 91 abuts against the primary transfer unit 40 at a position higher than the secondary transfer roller 45. This prevents the primary transfer unit 40 and the secondary transfer roller 45 from coming into contact with each other when the primary transfer unit 40 moves, thereby preventing damage or contamination on the belt 41 or the secondary transfer roller 45.

The door 20 also has an abutment portion 21 that serves as a second supporting portion that supports the transfer frame 48 of the primary transfer unit 40 at the second outside position. In other words, the primary transfer unit 40 at the second outside position is supported not only by the secondary transfer unit 90 at the second open position, but also by the door 20 at the first open position. The primary transfer unit 40 at the second outside position is also supported by the apparatus main body 1A.

When the primary transfer unit 40 is at the second inside position, the drive roller 46, which supports the belt 41 on the downstream side of the second moving path as a first roller, is positioned higher than the tension roller 47, which supports the belt 41 on the upstream side of the second moving path. In other words, the primary transfer unit 40 is inclined at the second inside position. When the primary transfer unit 40 moves from the second inside position to the second outside position, the drive roller 46 and the tension roller 47 are at approximately the same height, and the difference in height between these rollers decreases. In other words, the primary transfer unit 40 is extended in the substantially horizontal direction at the second outside position. When the primary transfer unit 40 is at the second outside position, the end (front end part) of the transfer frame 48 on the downstream side of the second moving path is supported by the abutment portion 21 of the door 20, and the end (rear end part) on the upstream side of the second moving path is supported by the abutment portion 91 of the secondary transfer unit 90. The primary transfer unit 40 is in an extended, substantially horizontal position, which stabilizes the support provided by the abutment portions 21 and 91.

The transfer frames 48 are arranged on the sides of the belt 41 in the direction of the rotation axis of for example the drive roller 46 (the width direction of the belt 41). A pair of abutment portions 21 and 91 are provided corresponding to the pair of transfer frames 48. In other words, the primary transfer unit 40 is supported by the secondary transfer unit 90 and the door 20, as both sides of the primary transfer unit 40 on the tip end side are supported by the pair of abutment portions 91 and both sides on the rear end side are supported by the pair of abutment portions 21.

Figure 4:
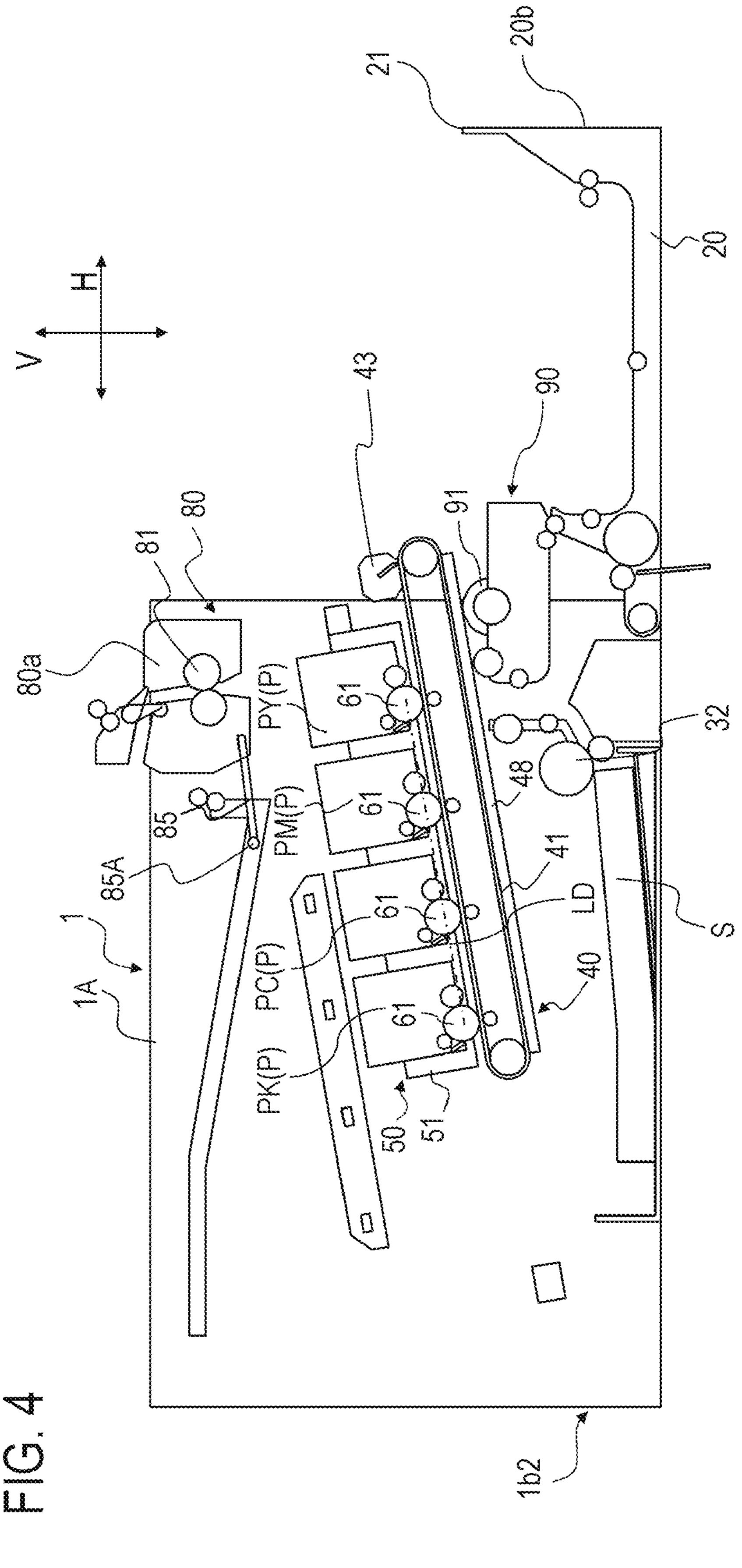
FIG. 4 is a view showing how the primary transfer unit and the tray unit according to the first embodiment are pulled out.
Figure 5:
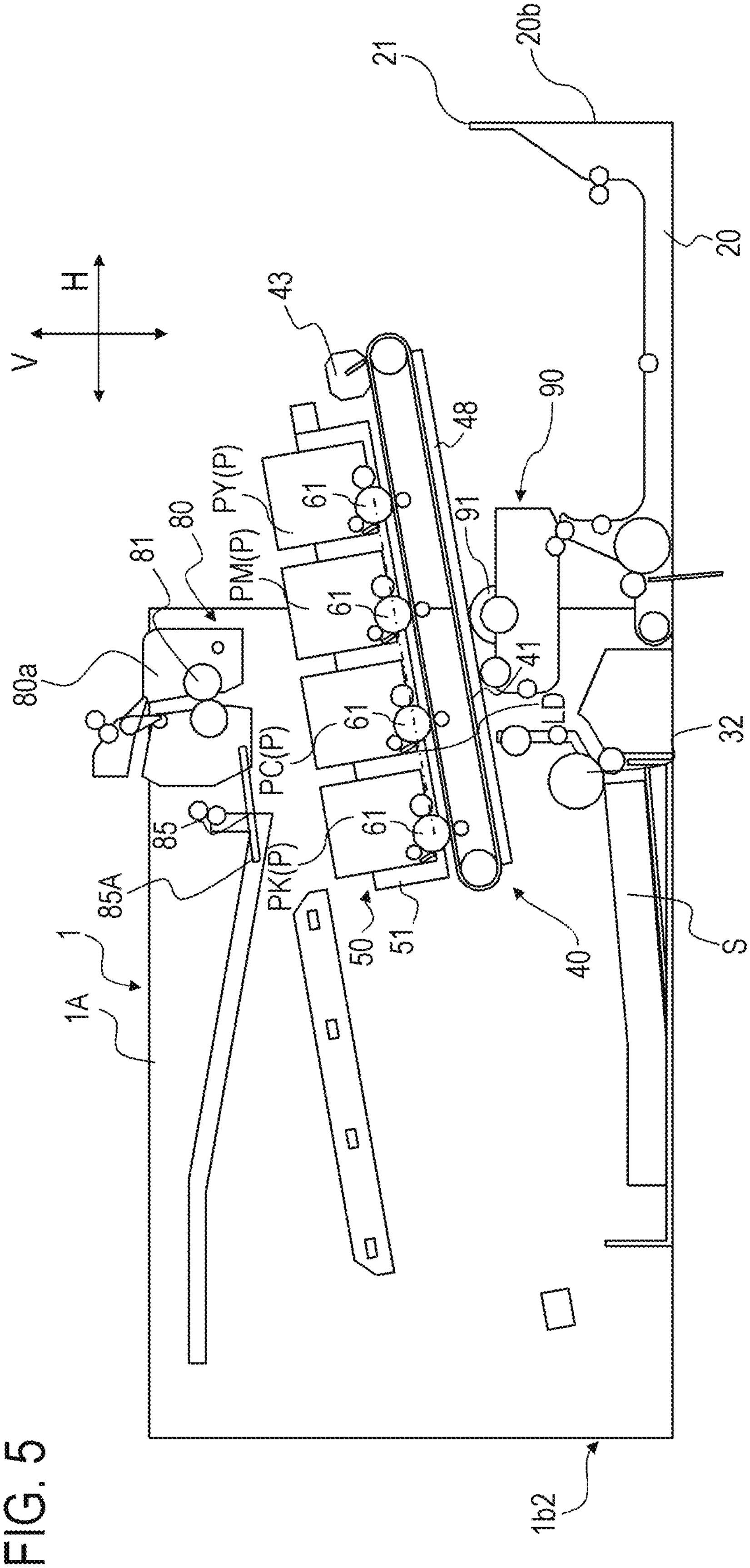
FIG. 5 is a view showing how the primary transfer unit and the tray unit according to the first embodiment are pulled out.
Figure 6:
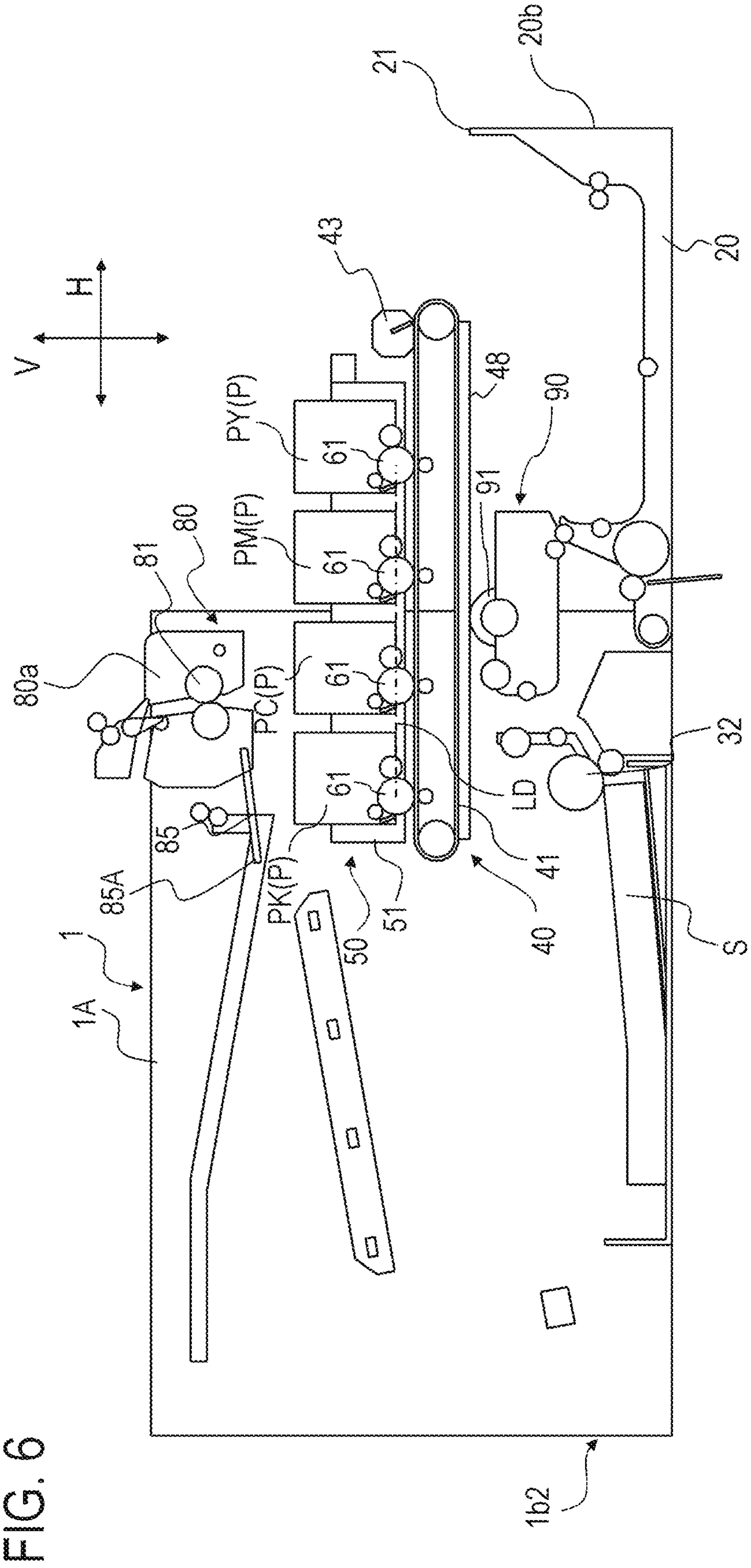
FIG. 6 is a view showing how the primary transfer unit and the tray unit according to the first embodiment are pulled out.

As shown in FIG. 2, when the tray unit 50 is at the first inside position and the primary transfer unit 40 is at the second inside position, the transfer frame 48 and the abutment portion 91 are not in contact. In other words, before the primary transfer unit 40 moves, the primary transfer unit 40 is not supported by the secondary transfer unit 90. As shown in FIG. 4, while the tray unit 50 and primary transfer unit 40 move from the inside to the outside of the apparatus main body 1A, the transfer frames 48 come into contact with the abutment portion 91, and the primary transfer unit 40 is supported by the secondary transfer unit 90. This enables the self-weights of the tray and cartridge to be supported without adding any new support member or support shape to the opening and closing member, thereby suppressing any increase in the size or cost of the apparatus main body.

Figure 10:
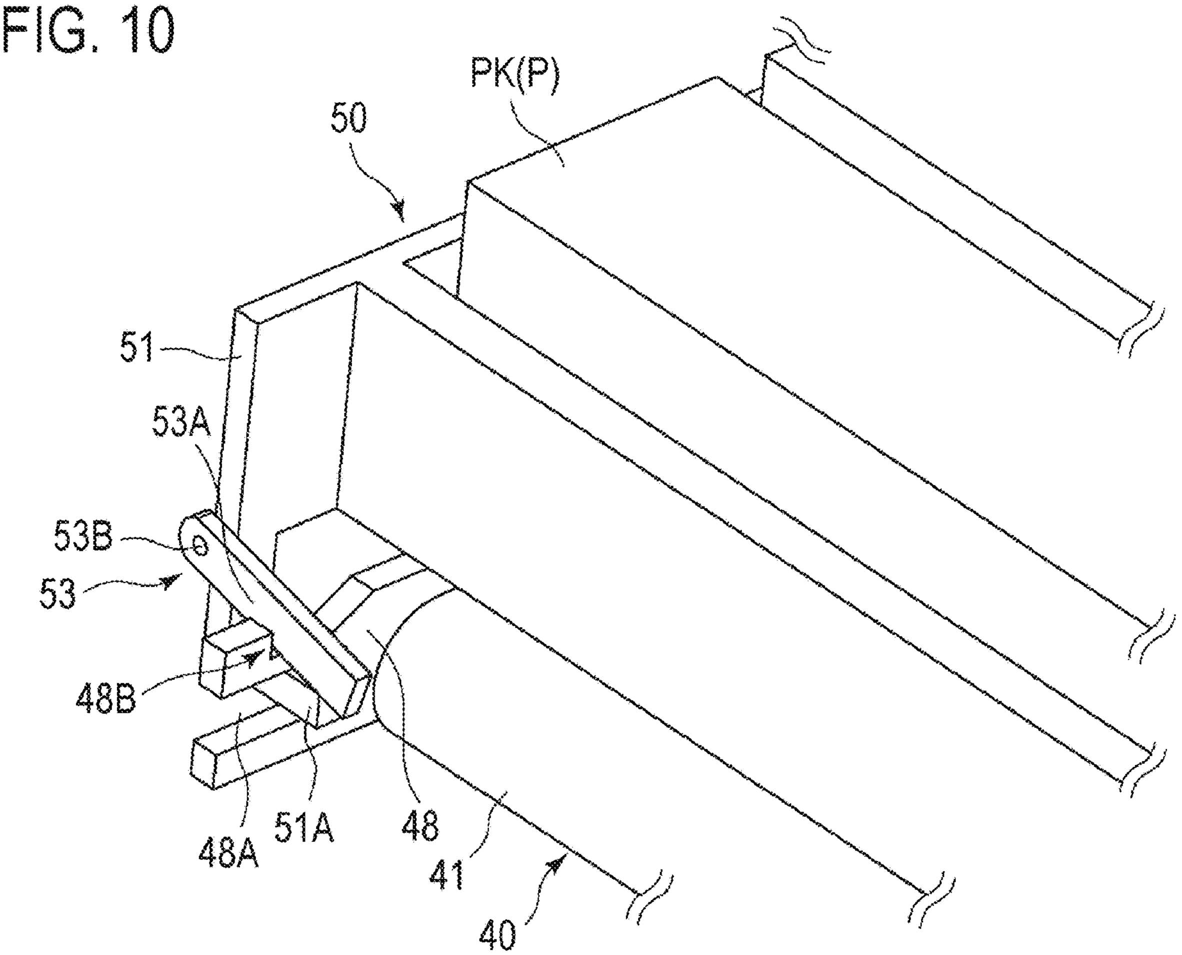
FIG. 10 is a view for illustrating a connection member used to connect the tray and the primary transfer unit according to the first embodiment.
Figure 11:
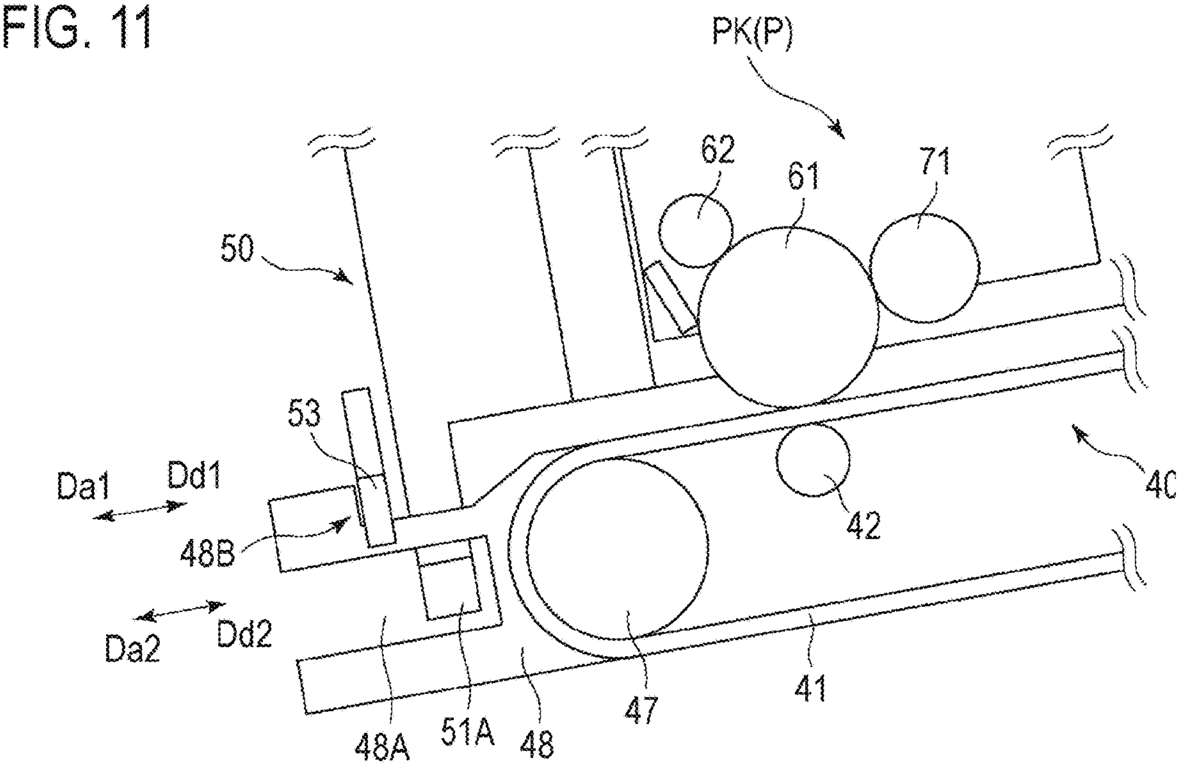
FIG. 11 is a view for illustrating the connection member used to connect the tray and the primary transfer unit according to the first embodiment.
Figure 12:
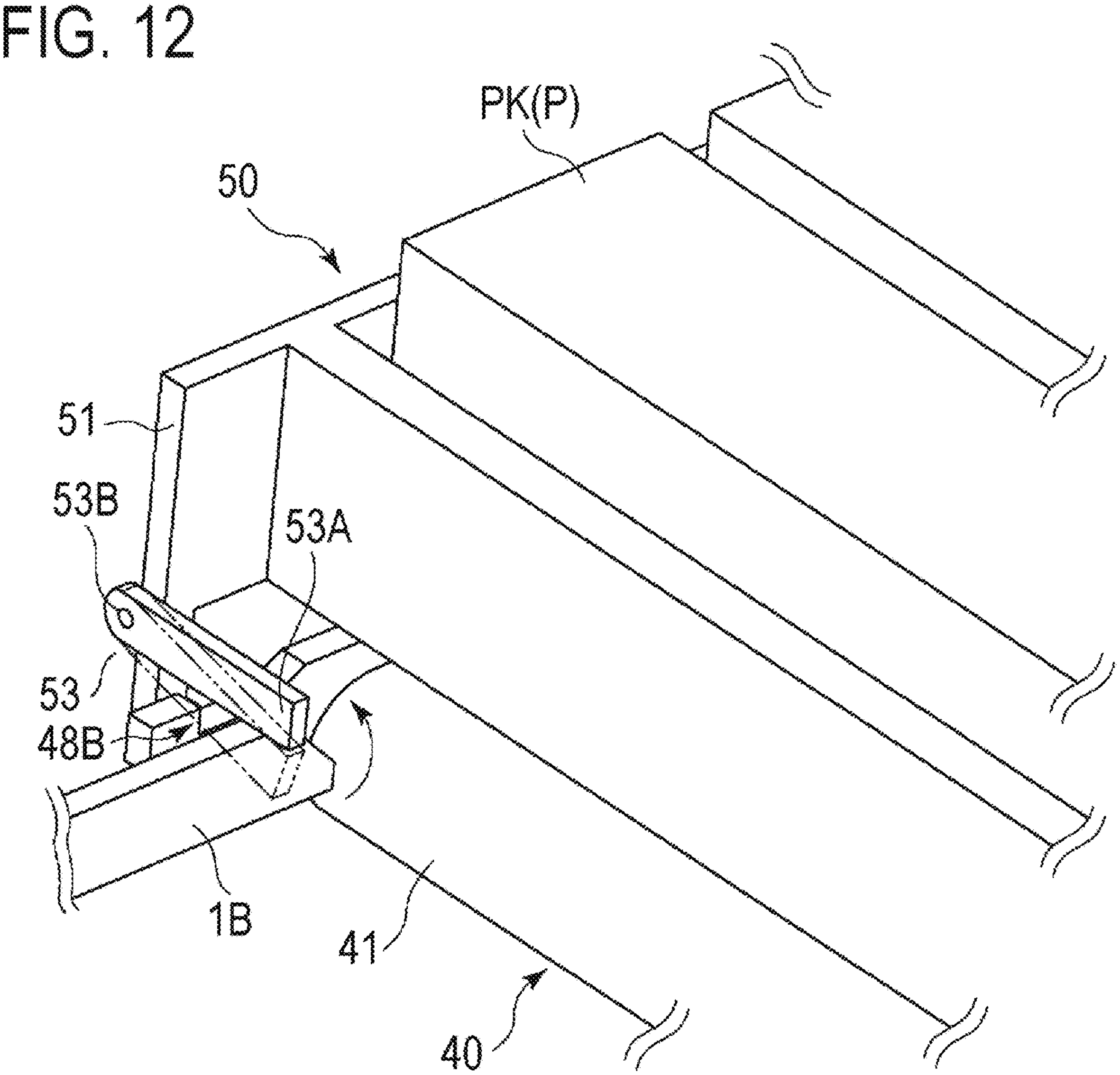
FIG. 12 is a view for illustrating the connection member used to connect the tray and the primary transfer unit according to the first embodiment.

The structure for moving the tray unit 50 and the primary transfer unit 40 in an integrated manner will be described with reference to FIGS. 10 to 12. FIGS. 10 to 12 illustrate the connecting member (lever, stopper, locking member) 53 that connects the tray 51 of the tray unit 50 and the primary transfer unit 40.

The printer 1 according to the embodiment has a locking member 53. In the embodiment, the locking member 53 is provided at the tray 51 of the tray unit 50. The locking member 53 has a transfer locking portion 53A and is rotatable around the rotation center 53B. The tray 51 is provided with a transfer connection portion 51A. The primary transfer unit 40 includes the drive roller 46, the tension roller 47, and the transfer frame 48 that supports the primary transfer roller 42, and the transfer frame 48 includes a tray connection groove 48A and a locking connection portion 48B.

The locking member 53 rotates around the rotation center 53B and thus can move to the connection position, where the transfer locking portion 53A engages with the locking connection portion 48B to connect the primary transfer unit 40 and the tray unit 50, and to the unlocking position retracted from the connection position. As the transfer connection portion 51A engages with the tray connection groove 48A, the tray unit 50 is restricted from moving in the first removal direction Dd1 and in the direction orthogonal to the first removal direction Dd1 with respect to the primary transfer unit 40. Meanwhile, the primary transfer unit 40 is restricted from moving in the second attachment direction Da2 and in the direction orthogonal to the second attachment direction Da2 with respect to the tray unit 50. A similar structure is provided at a total of four locations, near both ends of the tension roller 47 in the direction of the rotation axis of the tension roller 47, and near both ends of the drive roller 46 in the direction of the rotation axis of the drive roller 46.

When the transfer locking portion 53A of the locking member 53 at the connected position engages with the locking connection portion 48B, the tray unit 50 is restricted from moving in the first attachment direction Da1 with respect to the primary transfer unit 40. Meanwhile, the primary transfer unit 40 is restricted from moving in the second extraction direction Dd2 with respective to the tray unit 50. The locking member 53 and the locking connection portion 48B may also be provided at both ends of the primary transfer unit 40 in the direction of the rotation axis of the tension roller 47.

In this way, when the transfer connection portion 51A engages with the tray connection groove 48A and the locking member 53 at the connected position engages with the locking connection portion 48B, the primary transfer unit 40 and the tray unit 50 are restricted from moving relative to each other. In this state, there may be some clearance between the primary transfer unit 40 and the tray unit 50. In other words, it can be said that the transfer connection portion 51A and the locking member 53 function as a tray side connection device, and the tray connection groove 48A and the locking connection portion 48B function as a transfer side connection device. When the tray side connection device and the transfer side connection device are connected, the tray unit 50 and the primary transfer unit 40 are connected, and the tray unit 50 and the primary transfer unit 40 move in an integrated manner.

Meanwhile, as shown in FIG. 12, the apparatus main body 1A has an unlocking portion 1B. When the tray unit 50 is at the first inside position and the primary transfer unit 40 is at the second inside position, the locking member 53 is in contact with the unlocking portion 1B and is in the unlocking position. In this state, the transfer locking portion 53A is separated from the locking connection portion 48B.

When the tray unit 50 is moved in the first removal direction Dd1 while the locking member 53 is in the unlocking position, the primary transfer unit 40 is pushed in the second removal direction Dd2 by the transfer connection portion 51A. As a result, the primary transfer unit 40 is also moved in the second removal direction Dd2 together with the tray unit 50. When the tray unit 50 has moved a prescribed distance in the first removal direction Dd1, the locking member 53 moves away from the unlocking portion 1B and moves to the connecting position, where it engages with the locking connection portion 48B. While the locking member 53 is in the connection position and engaged with the locking connection portion 48B, the tray unit 50 is moved to the first outside position, and the primary transfer unit 40 is moved to the second outside position.

When the tray unit 50 is moved in the first attachment direction Da1 while the locking member 53 is engaged with the locking connection portion 48B, the primary transfer unit 40 is pushed by the locking member 53 in the second attachment direction Da2. As a result, the primary transfer unit 40 is also moved in the second attachment direction Da2 together with the tray unit 50.

When the primary transfer unit 40 is moved in the second attachment direction Da2 while the locking member 53 is engaged with the locking connection portion 48B, the primary transfer unit 40 pushes the transfer connection portion 51A, and the tray unit 50 is pushed in the first attachment direction Da1. As a result, the tray unit 50 is also moved in the first attachment direction Da1 together with the primary transfer unit 40.

When the tray unit 50 and primary transfer unit 40 are moved together towards the inside of the apparatus main body 1A, the locking member 53 is moved to the unlocking position by the unlocking portion 1B. In this state, even if the tray unit 50 is moved in the first attachment direction Da1, the primary transfer unit 40 does not move. Therefore, in the process of closing the door 20, the secondary transfer unit 90 is closed, and the primary transfer unit 40 is pushed in the second attachment direction Da2 and pushed further inside the apparatus main body 1A (second inside position) by the force of the secondary transfer roller 45 contacting the primary transfer unit 40. In other words, the secondary transfer unit 90 can push the primary transfer unit 40 so that the primary transfer unit 40 is positioned at the second inside position. The door 20 may push the tray unit 50 so that the tray unit 50 is positioned at the first inside position.

Meanwhile, when the primary transfer unit 40 is moved in the second removal direction Dd2 while the locking member 53 is at the unlocking position and the tray unit 50 is at the first inside position, the primary transfer unit 40 can be moved from the second inside position to the second outside position independently of the tray unit 50. In the printer 1 according to the embodiment, as shown in FIG. 8, the primary transfer unit 40 can be moved to the outside (second outside position) of the apparatus main body 1A while the tray unit 50 is positioned inside (first inside position) the apparatus main body 1A. The primary transfer unit 40 is removable from the apparatus main body 1A and can be replaced with a new primary transfer unit 40.

According to the embodiment, when the tray unit 50 is at the first inside position, the tray unit 50 is positioned with respect to the apparatus main body 1A independently of the primary transfer unit 40. Also, when the primary transfer unit 40 is at the second inside position, the primary transfer unit 40 is positioned with respect to the apparatus main body 1A independently of the tray unit 50. This is because priority is given to accurately positioning the primary transfer unit 40 and the tray unit 50 with respect to the apparatus main body 1A. Therefore, when the tray unit 50 is at the first inside position and the primary transfer unit 40 is at the second inside position, there is small clearance between the tray connection groove 48A and the transfer connection portion 51A.

When the tray unit 50 is at the first inside position and the primary transfer unit 40 is at the second inside position, the clearance between the tray connection groove 48A and the transfer connection portion 51A may be eliminated so that the tray unit 50 and the primary transfer unit 40 can be positioned relative to each other. In this case, the primary transfer unit 40 and the tray unit 50 can be positioned relative to each other with high precision.

Movement of Tray Unit and Primary Transfer Unit

As shown in FIGS. 1, 8 and 9, the tray unit 50 and the primary transfer unit 40 are inclined with respect to the horizontal direction H when they are mounted on the apparatus main body 1A. More specifically, when the tray unit 50 is at the first inside position, the rotation axis of the photosensitive drum 61 that is close to the first end 1*b*1 is located higher in the vertical direction V than the rotation axis of the photosensitive drum 61 that is far from the first end 1*b*1.

More specifically, while the tray unit 50 is at the first inside position, the second photosensitive drum is closer to the first end 1*b*1 than the first photosensitive drum, and the rotation axis of the second photosensitive drum is positioned higher in the vertical direction V than the rotation axis of the first photosensitive drum. Similarly, the third photosensitive drum is closer to the first end 1*b*1 than the second photosensitive drum, and the rotation axis of the third photosensitive drum is positioned higher the rotation axis of the second photosensitive drum in the vertical direction V. The fourth photosensitive drum is closer to the first end 1*b*1 than the third photosensitive drum, and the rotation axis of the fourth photosensitive drum is positioned higher than the rotation axis of the third photosensitive drum in the vertical direction V.

Here, the straight line connecting the centers of the photosensitive drums 61 is defined as the straight line LD. In the embodiment, when the tray unit 50 is at the first inside position, the straight line LD is inclined upward with respect to the horizontal direction H, from the side far from the first end 1*b*1 to the side close to the first end 1*b*1. The abutment surface of the belt 41 that abuts the first photosensitive drum, the second photosensitive drum, the third photosensitive drum, and the fourth photosensitive drum slopes upward from the side far from the first end 1*b*1 toward the side close to the first end 1*b*1.

When the tray unit 50 moves from the first inside position to the first outside position, the tray unit 50 moves in a direction inclined with respect to the horizontal direction H (in this embodiment, the direction inclined upward with respect to the horizontal direction H). In other words, when the tray unit 50 moves from the first inside position to the first outside position, the tray unit 50 moves obliquely in an upward direction.

When the tray unit 50 moves from the first inside position to the first outside position, the movement direction of the tray unit 50 changes from the obliquely upward direction to a downward direction. The movement direction of the tray unit 50 may be parallel to the horizontal direction H or include an obliquely downward direction with respect to the horizontal direction H.

The angle formed by the straight line LD and the horizontal direction His smaller when the tray unit 50 is at the first outside position than when the tray unit 50 is at the first inside position. In this embodiment, when the tray unit 50 is at the first outside position, the straight line LD and the horizontal direction H are parallel, but the straight line LD may be inclined downward or upward with respect to the horizontal direction H.

Similarly, when the primary transfer unit 40 moves from the second inside position to the second outside position, the movement direction of the primary transfer unit 40 changes from an oblique upward direction to a downward direction. The movement direction of the primary transfer unit 40 may be parallel to the horizontal direction H or include an oblique downward direction with respect to the horizontal direction H.

The angle formed between the abutment surface of the belt 41 and the horizontal direction H is smaller when the primary transfer unit 40 is at the second outside position than when the primary transfer unit 40 is at the second inside position. In this embodiment, when the primary transfer unit 40 is at the second outside position, the abutment surface of the belt 41 and the horizontal direction H are parallel, but the contact surface of the belt 41 may be inclined downward or upward with respect to the horizontal direction H.

When the tray unit 50 is moved from the first outside position to the first inside position, the tray unit 50 moves in the horizontal direction H and then, partway through, moves obliquely downward from the middle. When moving from the second outside position to the second inside position, the primary transfer unit 40 moves in the horizontal direction H and then, partway through, moves obliquely downward. In this way, the self-weights of the tray unit 50 and the primary transfer unit 40 can be used when the tray unit 50 and the primary transfer unit 40 are inserted into the apparatus main body 1A.

According to the described embodiment, two units, the tray unit 50 and the primary transfer unit 40, are exemplified as supported units that are supported by the secondary transfer unit 90. However, the present disclosure is not limited to the structure. For example, a single unit that can take an inside position and an outside position with respect to the apparatus main body 1A may be supported by the secondary transfer unit 90. Alternatively, three or more units may be configured so that these units can take an inside position and an outside position with respect to the apparatus main body 1A independently or in part in conjunction with each other, and the secondary transfer unit 90 may directly or indirectly support such multiple units. In the embodiment, when the primary transfer unit 40 is positioned at the second outside position independently of the tray unit 50 while the tray unit 50 is stored in the apparatus main body 1A, the tray unit 50 can be supported by the secondary transfer unit 90.

Modifications

As described above, the photosensitive drum 61, the charging roller 62, and the developing roller 71 need only be provided in either the cartridge P or the tray 51. This will be described with reference to FIGS. 13A to 13D. FIGS. 13A to 13D illustrate the tray unit 50 according to modifications.

Figure 13A:
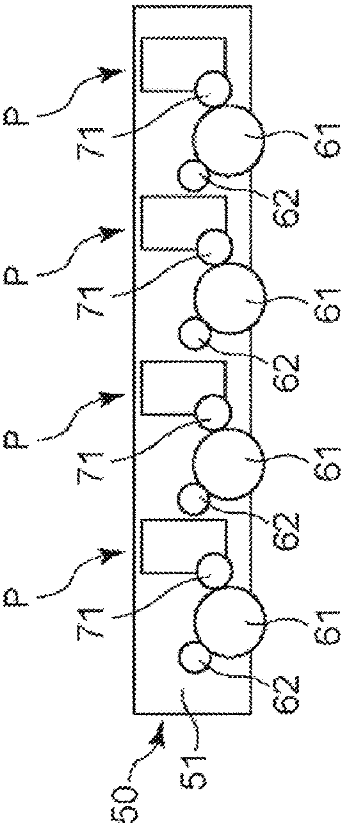
FIGS. 13A to 13D are views for illustrating a tray unit according to a modification.

For example, as shown in FIG. 13A, the tray 51 may have the photosensitive drums 61 and the charging rollers 62, and the cartridges P may have the developing rollers 71.

Figure 13B:
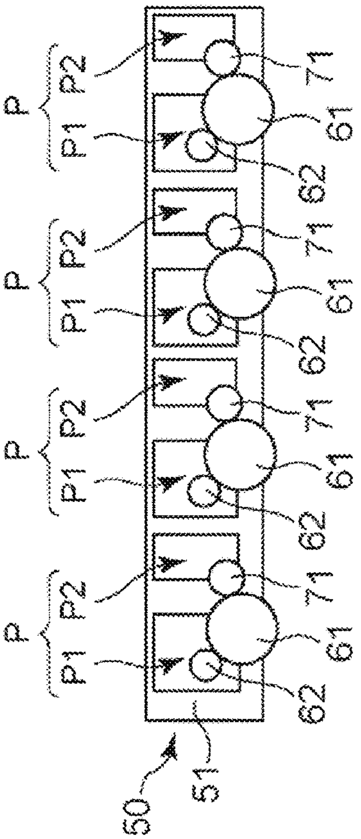

As shown in FIG. 13B, the cartridges P may each include a drum cartridge P1 having the photosensitive drum 61 and the charging roller 62 and a developing cartridge P2 having the developing roller 71. In other words, the cartridge P may be separated into the drum cartridge P1 and the developing cartridge P2. In this case, the drum cartridge P1 and the developing cartridge P2 are preferably detachable from the tray 51 independently of each other.

Figure 13C:
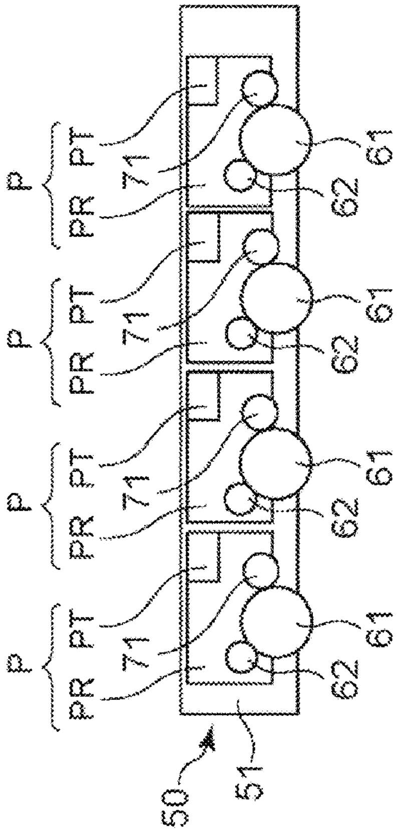

As shown in FIG. 13C, the cartridges P may each include a cartridge PR having the photosensitive drum 61, the charging roller 62, and the developing roller 71, and a cartridge PT having the toner to be replenished to the cartridge PR. In other words, the cartridge P may be separated into the cartridge PR and the cartridge PT.

Figure 13D:
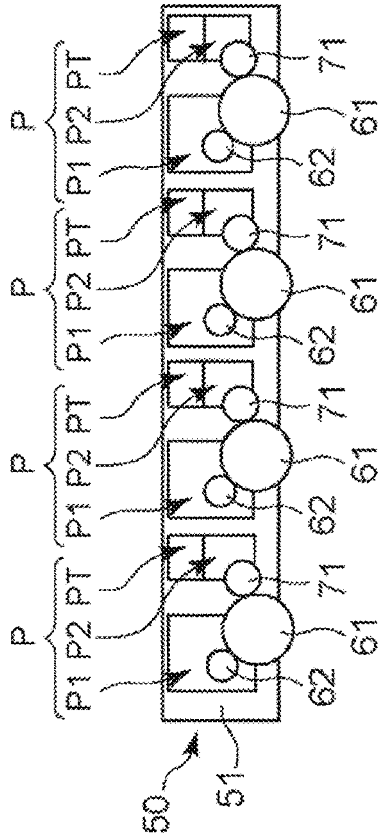

As shown in FIG. 13D, the cartridges P may each include the drum cartridge P1, the developing cartridge P2, and the toner cartridge PT. The drum cartridge P1 has the photosensitive drum 61 and the charging roller 62, the developing cartridge P2 has the developing roller 71, and the toner cartridge PT has the toner to be supplied to the developing cartridge P2. In other words, the cartridge P may be separated into the drum cartridge P1, the developing cartridge P2, and the cartridge PT.

Second Embodiment

A second embodiment of the present disclosure will be described. In the following description of the second embodiment, the same configurations as those in the first embodiment are designated by the same reference numerals. In the description of the second embodiment, the descriptions of the same configurations as those in the first embodiment will not be repeated in some cases.

Relation Between Tray Unit, Primary Transfer Unit, and Secondary Transfer Unit A printer 101 as an image forming apparatus according to the embodiment has an apparatus main body 101A having an opening 101A1. The printer 101, the apparatus main body 101A, and the opening 101A1 correspond to the printer 1, the apparatus main body 1A, and the opening 1A1, respectively in the first embodiment.

According to the embodiment, during the movement, the tray unit 50 and the primary transfer unit 40 are supported by a secondary transfer frame 192 included in a secondary transfer unit 190, and the movement in the width direction is restricted.

Figure 14:
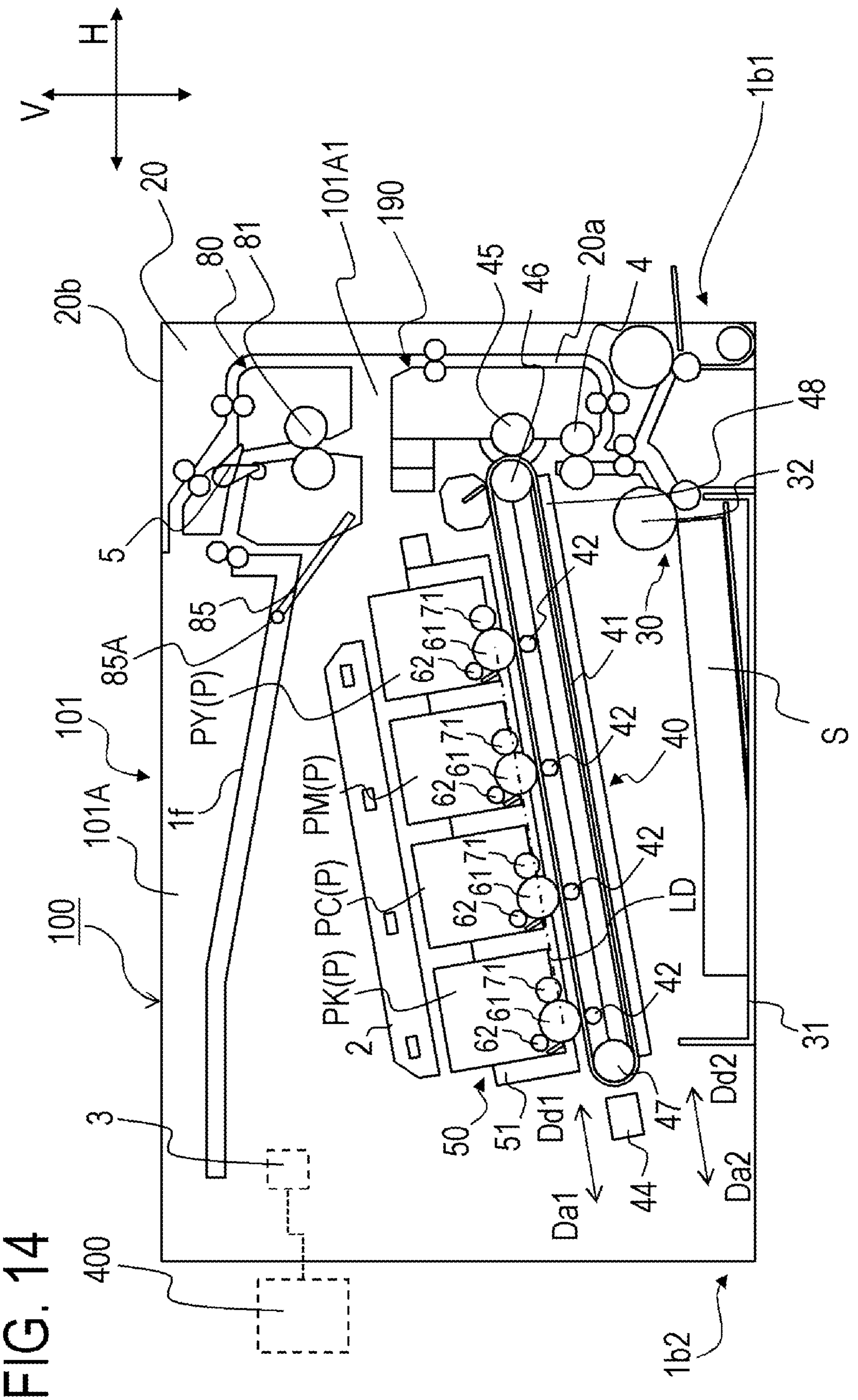
FIG. 14 is a view for illustrating an overall structure of a printer according to a second embodiment of the disclosure.
Figure 15:
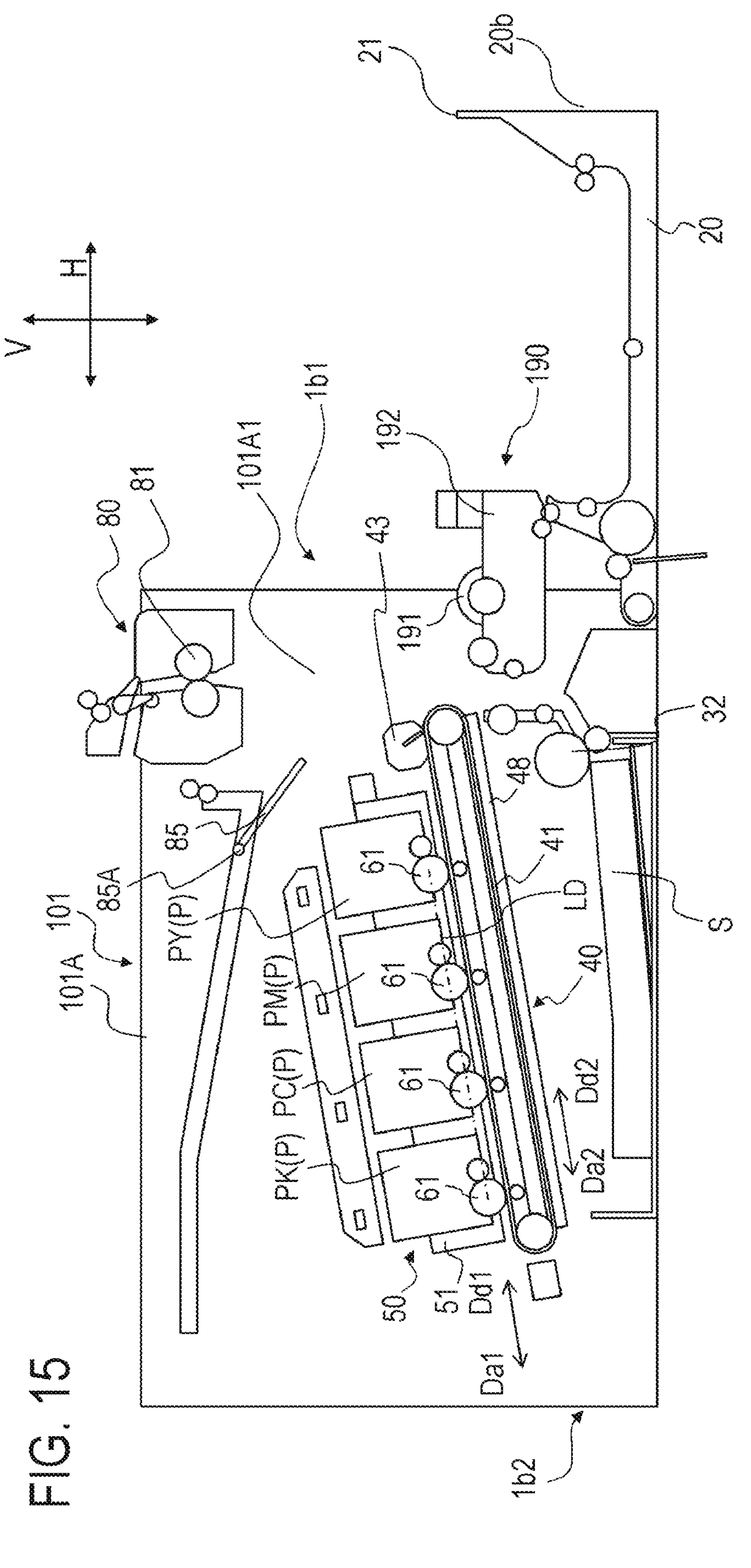
FIG. 15 is a view for illustrating a door, a fixing apparatus, and a primary transfer unit according to the second embodiment during movement.

With reference to FIGS. 14 to 17, the relation between the tray unit 50, the primary transfer unit 40 and the secondary transfer unit 190 will be described. As shown in FIGS. 14 and 15, the secondary transfer unit 190 is arranged so that it can be opened and closed with respect to the apparatus main body 101A. The secondary transfer unit 190 is configured to be opened and closed in conjunction with the opening and closing operation of the door 20, similarly to the secondary transfer unit 90 of the first embodiment.

Figure 16:
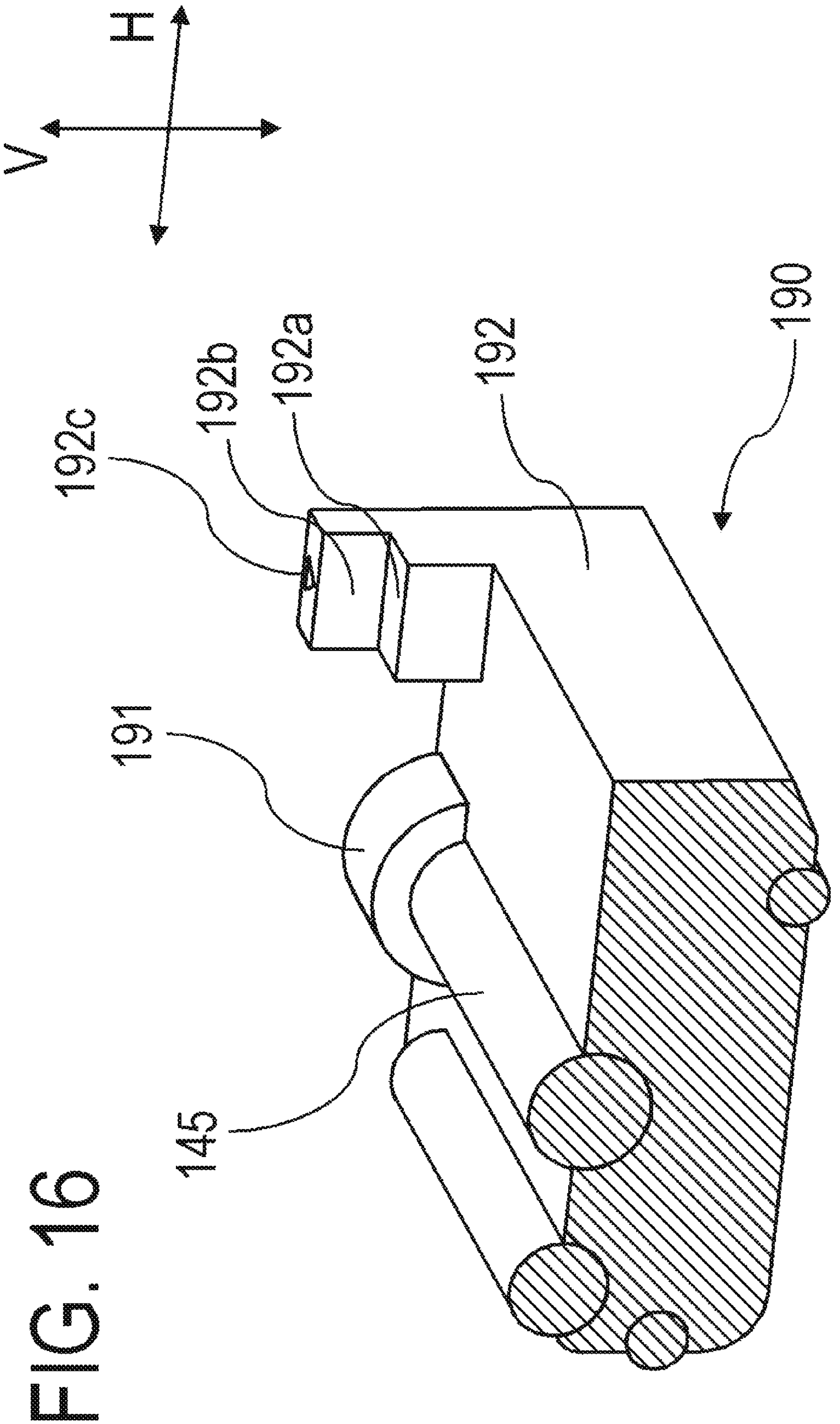
FIG. 16 is a view for illustrating a secondary transfer unit according to the second embodiment.

FIG. 16 is a perspective view of the secondary transfer unit 190 in the open state. As shown in FIG. 16, the secondary transfer unit 190 in this embodiment has an upwardly raised shape in the vertical direction V from the secondary transfer frame 192. The raised shape includes a support surface 190*a*, a restriction surface 190*b*, and a mark portion 192*c*. The support surface 190*a* supports the bottom surface of the transfer frame 48 when the primary transfer unit 40 moves. The restriction surface 190*b*, as a restriction portion, restricts the movement of the side surface of the transfer frame 48 when the primary transfer unit 40 moves. The mark portion 192*c* is a mark used when attaching the primary transfer unit 40 to the apparatus main body 101A.

Figure 17:
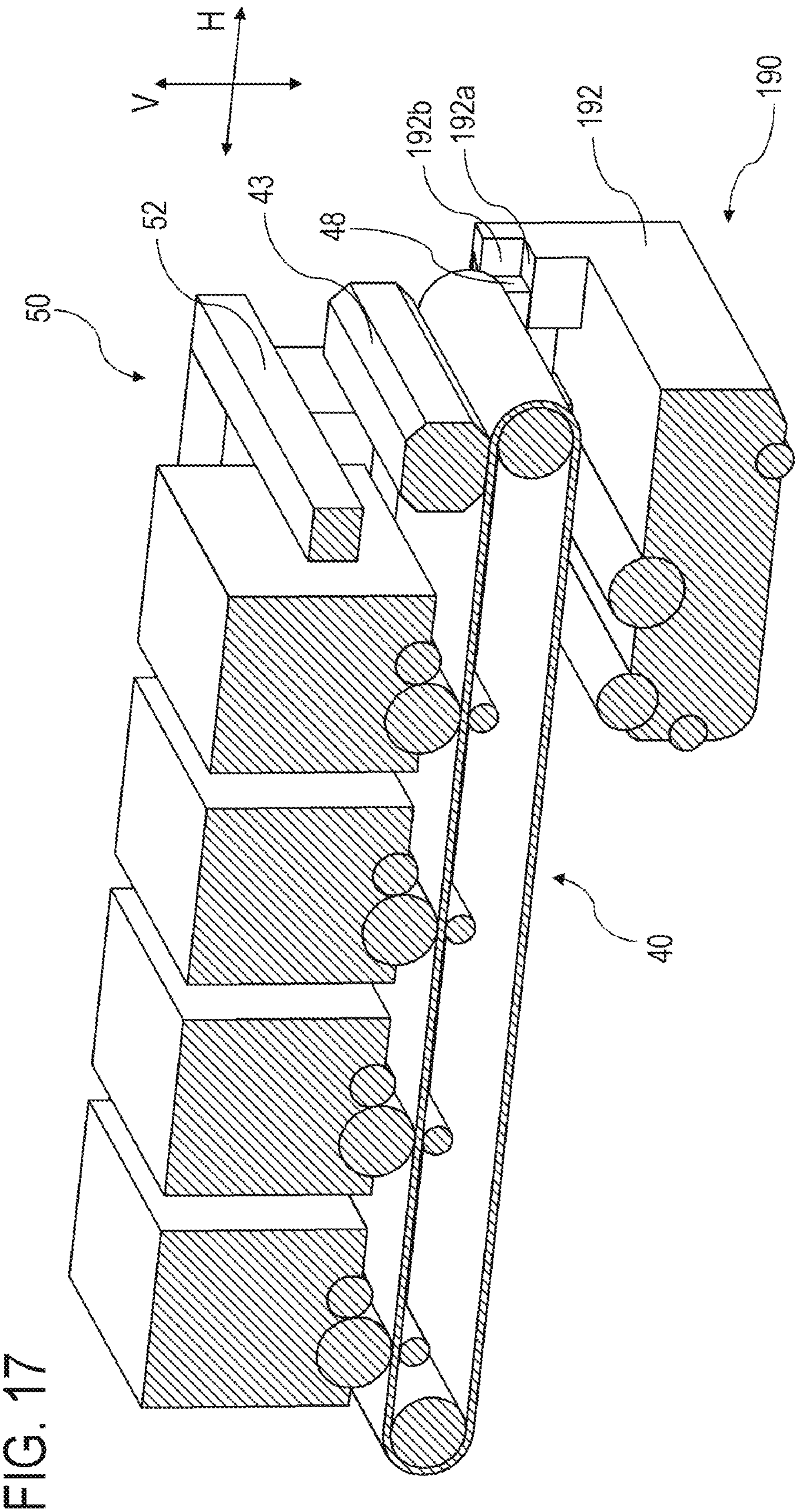
FIG. 17 is a view for illustrating the support/restriction structure by the secondary transfer unit according to the second embodiment.

FIG. 17 illustrates how the tray unit 50 and the primary transfer unit 40 are supported with respect to the secondary transfer unit 190 in the state shown in FIG. 16. As described above, the bottom surface of the transfer frame 48 is supported by the support surface 192*a*, and the movement of the side surface of the transfer frame 48 is restricted by the restriction surface 192*b*. More specifically, when the tray unit 50 and the primary transfer unit 40 are pulled out to the outside of the apparatus main body 101A, the movement of the tray unit 50 and the primary transfer unit 40 in the width direction of the apparatus main body 101A is restricted. This can prevent the transfer frame 48 from coming off of the secondary transfer frame 192 during movement, which can prevent damage and contamination on the belt. The position of the support surface 192*a* in the vertical direction V is arranged higher than the secondary transfer roller 145. This can suppress damage and contamination on the belt 41 and the secondary transfer roller 145 when the primary transfer unit 40 moves.

The features of the above-described embodiments can be combined with each other.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2024-038813, filed on Mar. 13, 2024, which is hereby incorporated by reference herein in its entirety.

What is claimed is:

1. An image forming apparatus configured to form an image on a recording material comprising:

an apparatus main body;

a supported unit movable relative to the apparatus main body to an inside position inside the apparatus main body and an outside position outside the apparatus main body, the supported unit comprising a primary transfer roller, an intermediate transfer belt, and a photosensitive member configured to bear a toner image;

an opening/closing member movable relative to the apparatus main body to a closed position and an open position retracted from the closed position, the opening/closing member being configured to block a movement path for the supported unit from the inside position to the outside position in a case where the opening/closing member is at the closed position; and a transfer unit having a secondary transfer roller that abuts against the intermediate transfer belt, wherein in a case where the supported unit is at the inside position, the intermediate transfer belt is positioned below the photosensitive member, and wherein in a case where the supported unit is at the outside position, the supported unit is supported by the transfer unit, and the transfer unit is positioned below the intermediate transfer belt.

2. The image forming apparatus according to claim 1, wherein the transfer unit is movable relative to the apparatus main body and the opening/closing member.

3. The image forming apparatus according to claim 2, wherein in a case where the closed position is a first closed position, and the open position is a first open position, the transfer unit is movable relative to the apparatus main body to a second closed position and a second open position retracted from the second closed position and in a case where the transfer unit is at the second closed position, the transfer unit blocks the moving path at a position further inside than the opening/closing member.

4. The image forming apparatus according to claim 3, wherein in a case where the transfer unit is at the second open position, the transfer unit is supported by the opening/closing member at the first open position.

5. The image forming apparatus according to claim 4, wherein in the case where the supported unit is at the outside position, the supported unit is also supported by the opening/closing member at the first open position.

6. The image forming apparatus according to claim 3, wherein the transfer unit has a supporting portion, the supporting portion supports the supported unit at the outside position in a case where the transfer unit is at the second open position, and wherein in the case where the transfer unit is at the second open position, the supporting portion abuts against the supported unit at a position higher than the secondary transfer roller.

7. The image forming apparatus according to claim 6, wherein the transfer unit has a bearing that supports the secondary transfer roller in a rotatable manner, and wherein the supporting portion is provided at the bearing.

8. The image forming apparatus according to claim 3, wherein the opening/closing member forms a part of an exterior of the apparatus main body, and wherein in a case where the opening/closing member moves between the first closed position and the first open position, the transfer unit moves between the second closed position and the second open position.

9. The image forming apparatus according to claim 3, wherein the supported unit comprises a first unit and a second unit, wherein the first unit is movable relative to the apparatus main body to a first inside position inside the apparatus main body and a first outside position outside the apparatus main body, and wherein the second unit is movable relative to the apparatus main body to a second inside position inside the apparatus main body and a second outside position outside the apparatus main body, wherein in a case where the first unit is at the first outside position, the first unit is supported by the second unit at the second outside position, and wherein in a case where the second unit is at the second outside position, the second unit is supported by the transfer unit.

10. The image forming apparatus according to claim 9, wherein the first unit comprises:

a tray movable relative to the apparatus main body between the first inside position and the first outside position;

the photosensitive member;

a toner image forming portion configured to form a toner image on the photosensitive member; and a cartridge detachably attached to the tray, the cartridge including at least the toner image forming portion, and wherein the second unit includes the intermediate transfer belt, and a toner image is transferred onto the intermediate transfer belt from the photosensitive member.

11. The image forming apparatus according to claim 10, wherein the intermediate transfer belt has an annular shape, wherein the second unit comprises:

a plurality of rollers disposed on an inner side of the annular shape and configured to tension the intermediate transfer belt; and a frame configured to support the plurality of rollers in a rotatable manner, and wherein the transfer unit comprises:

a supporting portion configured to support the frame in a case where the second unit is at the second open position; and a restriction portion configured to restrict movement of the frame in a rotation axis direction of the rollers in a case where the second unit is at the second open position.

12. The image forming apparatus according to claim 11, wherein the plurality of rollers comprise:

a first roller configured to support the intermediate transfer belt; and a second roller configured to support the intermediate transfer belt, wherein in a case where the second unit is at the second inside position, the first roller is at a position higher than the second roller, and wherein in a case where the second unit moves from the second inside position to the second outside position, the first roller is on a downstream side of the second roller, and a difference in height between the first roller and the second roller decreases.

13. The image forming apparatus according to claim 9, wherein in a case where the first unit moves between the first inside position and the first outside position, the second unit moves between the second inside position and the second outside position.

14. The image forming apparatus according to claim 9, wherein while the first unit remains at the first inside position, the second unit is configured to be movable between the second inside position and the second outside position.

15. An image forming apparatus configured to form an image on a recording material, comprising:

an apparatus main body;

a supported unit movable relative to the apparatus main body between an inside position inside the apparatus main body and an outside position outside the apparatus main body;

an opening/closing member movable relative to the apparatus main body to a closed position and an open position retracted from the closed position, the opening/closing member being configured to block a movement path for the supported unit from the inside position to the outside position when the opening/closing member is at the closed position; and a transfer unit having a transfer roller, wherein in a case where the supported unit is at the outside position, the supported unit is supported by the transfer unit, wherein the supported unit comprises:

a first unit movable relative to the apparatus main body to a first inside position inside the apparatus main body and a first outside position outside the apparatus main body, the first unit having a photosensitive member for bearing toner; and a second unit movable relative to the apparatus main body to a second inside position inside the apparatus main body and a second outside position outside the apparatus main body, the second unit having an intermediate transfer belt;

wherein in a case where the first unit is at the first inside position and the second unit is at the second inside position, the intermediate transfer belt is positioned below the photosensitive member, wherein in a case where the first unit is at the first outside position, the first unit is supported by the second unit at the second outside position, and wherein in a case where the second unit is at the second outside position, the second unit is supported by the transfer unit, and the transfer unit is positioned below the intermediate transfer belt.

16. The image forming apparatus according to claim 15, wherein in a case where the first unit moves between the first inside position and the first outside position, the second unit moves between the second inside position and the second outside position.

17. The image forming apparatus according to claim 15, wherein while the first unit remains at the first inside position, the second unit is configured to be movable between the second inside position and the second outside position.

18. The image forming apparatus according to claim 15, wherein the supported unit comprises a primary transfer roller, and the transfer roller is a secondary transfer roller that abuts against the intermediate transfer belt.

* * * * *